(12) United States Patent
Vacar et al.

(10) Patent No.: US 7,870,440 B2
(45) Date of Patent: Jan. 11, 2011

(54) METHOD AND APPARATUS FOR DETECTING MULTIPLE ANOMALIES IN A CLUSTER OF COMPONENTS

(75) Inventors: Dan Vacar, San Diego, CA (US); David K. McElfresh, San Diego, CA (US); Kenny C. Gross, San Diego, CA (US); Leoncio D. Lopez, Escondido, CA (US)

(73) Assignee: Oracle America, Inc., Redwood Shores, CA (US)

(*) Notice: Subject to any disclaimer, the term of this patent is extended or adjusted under 35 U.S.C. 154(b) by 491 days.

(21) Appl. No.: 12/048,922

(22) Filed: Mar. 14, 2008

(65) Prior Publication Data

US 2009/0234484 A1 Sep. 17, 2009

(51) Int. Cl.
*G06F 11/00* (2006.01)

(52) U.S. Cl. .......................... 714/47; 714/48

(58) Field of Classification Search .................. 714/47, 714/48, 39, 40, 4
See application file for complete search history.

(56) References Cited

U.S. PATENT DOCUMENTS

| | | | |
|---|---|---|---|
| 7,349,826 B2* | 3/2008 | Subramanian et al. | 702/185 |
| 7,646,725 B1* | 1/2010 | Soukup et al. | 370/252 |
| 7,730,364 B2* | 6/2010 | Chang et al. | 714/47 |
| 2003/0065986 A1* | 4/2003 | Fraenkel et al. | 714/47 |
| 2005/0144264 A1* | 6/2005 | Gruhn et al. | 709/223 |

* cited by examiner

*Primary Examiner*—Dieu-Minh Le
(74) *Attorney, Agent, or Firm*—Park, Vaughan, Fleming & Dowler LLP

(57) ABSTRACT

A system that detects multiple anomalies in a cluster of components is presented. During operation, the system monitors derivatives obtained from one or more inferential variables which are received from sensors in the cluster of components. The system then determines whether one or more components within the cluster have experienced an anomalous event based on the monitored derivatives. If so, the system performs one or more remedial actions.

23 Claims, 11 Drawing Sheets

METHOD AND APPARATUS FOR DETECTING MULTIPLE ANOMALIES IN A CLUSTER OF COMPONENTS

BACKGROUND

1. Field of the Invention

The present invention relates to techniques for monitoring the health of components within a cluster of components. More specifically, the present invention relates to a method and apparatus for detecting multiple anomalies in a cluster of components.

2. Related Art

For mission-critical systems, it is desirable to minimize downtime. One technique for minimizing downtime is to provide redundancy. For example, a fail-over mechanism can be used to automatically switch from a system that has failed to a healthy system. Unfortunately, fail-over mechanisms only take effect after a system has failed.

It is also desirable to be able to determine the reliability of components used in mission-critical systems so that only components with a mean-time before failure (MTBF) that exceeds the system specification can be used. One technique for determining the reliability of components is to perform accelerated-life studies where components are placed in stress-test chambers. However, it is typically not possible to apply pass/fail tests for components (or systems) being stressed while the components are in stress-test chambers. In practice, the components under stress are periodically removed from the stress-test chambers and are tested to determine the number of components that have failed. The components that have not failed are then returned to the stress-test chambers and are subjected to the desired accelerated-stress conditions. At the end of the accelerated-life study, a history of failed versus healthy component counts at discrete time intervals is generated (e.g., at 100 Hrs, 200 Hrs, 300 Hrs, etc.). This history can be used to predict the reliability of the components. Unfortunately, stopping an accelerated-life study to externally test the components is costly and time-consuming.

Even if a system is populated with components which are deemed reliable (e.g., having an MTBF greater than required by the system specification), these components can still fail prematurely. For example, operating a system in extreme heat can cause components in the system to fail prematurely. Hence, it is desirable to periodically monitor the components during operation of the system to determine whether the components are at the onset of degradation. If so, a remedial action (e.g., replacing a degrading component) can be performed preemptively to prevent an unexpected system failure.

One technique for monitoring the health of components is to use sensors within a system to detect the onset of degradation of components within the system. Unfortunately, as the number of components to be monitored increases, the number of sensors required to monitor these components increases, which increases the cost and computing resources required to process the sensor data.

Hence, what is needed is a method and an apparatus for detecting anomalies in a cluster of components without the problems described above.

SUMMARY

Some embodiments of the present invention provide a system that detects multiple anomalies in a cluster of components. During operation, the system monitors derivatives obtained from one or more inferential variables which are received from sensors in the cluster of components. The system then determines whether one or more components within the cluster have experienced an anomalous event based on the monitored derivatives. If so, the system performs one or more remedial actions.

Some embodiments of the present invention provide a system that detects multiple anomalies in a cluster of components. During operation, the system monitors derivatives obtained from one or more inferential variables which are received from sensors in the cluster of components. The system then determines whether one or more specified events occurred within the cluster of components based on the monitored derivatives. If so, the system determines the probability that the cluster of components is in a specified state based on the one or more specified events that occurred. If the determined probabilities meet specified criteria, the system performs one or more remedial actions.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code, data structures, and/or data, which can be stored on a computer-readable storage medium as described above. When a computer system reads and executes the code and/or data stored on the computer-readable storage medium, the computer system performs the methods and processes embodied as code, data structures, and/or data that are stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computer System

Figure 1A:
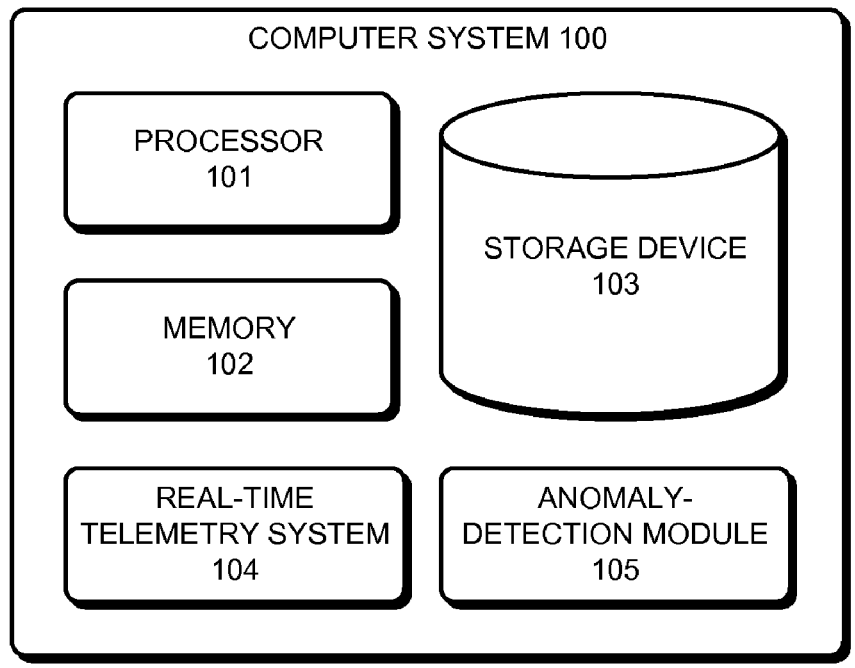
FIG. 1A presents a block diagram of a computer system in accordance with an embodiment of the present invention.

FIG. 1A presents a block diagram illustrating a computer system 100 in accordance with an embodiment of the present invention. Computer system 100 includes processor 101, memory 102, storage device 103, real-time telemetry system 104, and anomaly-detection module 105.

Processor 101 can generally include any type of processor, including, but not limited to, a microprocessor, a mainframe computer, a digital signal processor, a personal organizer, a device controller and a computational engine within an appliance. Memory 102 can include any type of memory, including but not limited to, dynamic random access memory (DRAM), static random access memory (SRAM), flash memory, read only memory (ROM), and any other type of memory now known or later developed. Storage device 103 can include any type of non-volatile storage device that can be coupled to a computer system. This includes, but is not limited to, magnetic, optical, and magneto-optical storage devices, as well as storage devices based on flash memory and/or battery-backed up memory.

In one embodiment of the present invention, real-time telemetry system 104 is separate from computer system 100. Note that real-time telemetry system 104 is described in more detail below with reference to FIG. 12.

In some embodiments of the present invention, anomaly-detection module 105 is separate from computer system 100. Note that anomaly-detection module 105 is described in more detail below with reference to FIGS. 1B to 6. In some embodiments, real-time telemetry system 104 includes anomaly-detection module 105.

Figure 1B:
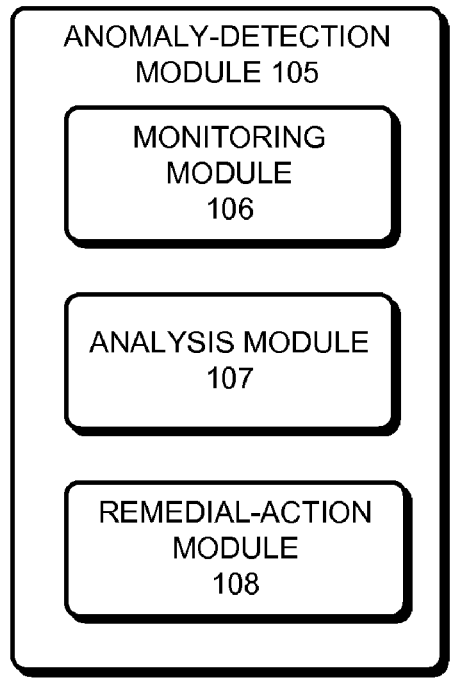
FIG. 1B presents a block diagram of an anomaly-detection module in accordance with an embodiments of the present invention.

FIG. 1B presents a block diagram of anomaly-detection module 105 in accordance with an embodiments of the present invention. Anomaly-detection module 105 includes monitoring module 106, analysis module 107, and remedial-action module 108. Monitoring module 106 is configured to monitor derivatives obtained from one or more inferential variables which are received from sensors in the cluster of components. Analysis module 107 is configured to determine whether one or more components within the cluster have experienced an anomalous event based on the monitored derivatives. In some embodiments, the anomalous event includes: a failure event, a fault event, and a recovery event. If analysis module 107 determines that one or more components within the cluster have experienced an anomalous event, remedial action module 108 is configured to perform one or more remedial actions. In some embodiments, one or more of monitoring module 106, analysis module 107, and remedial-action module 108 are included in one or more integrated circuit (IC) chips. For example, these IC chips can include, but are not limited to, application-specific integrated circuit (ASIC) chips, field-programmable gate arrays (FPGAs), and other programmable-logic devices now known or later developed.

Overview

Some embodiments of the present invention detect multiple anomalies in clusters of components. In these embodiments, the anomalies can be detected regardless of whether the individual component anomalies evolve to completion, and regardless of whether repair actions are taken or whether component self-healing occurs.

Note that the discussion below refers to clusters of components, but can also be applied to clusters of systems. Also note that that the discussion below refers to accelerated-life studies of multiple components. However, the techniques below can be applied to any system in which multiple components are to be monitored. For example, complex computing systems, such as high-performance computing grids, clusters of servers, and groups of processors within a server system, and switching resources, such as routers, and cross-connects, can be monitored using the techniques described below.

For components undergoing accelerated-life studies, it is often desirable to supply power to the devices under test while the components are in the stress-test chambers. In some embodiments, the current being applied to the devices is monitored to detect anomalies in the noise-signature time-series of the current that indicate that a component is at the onset of degradation (or failure). In these embodiments, the current-noise time-series is an "inferential variable" that is used to detect the onset of failure and/or the exact time of failure for a component.

In some embodiments, the information extracted from the current-noise time series can be used to adjust the accelerated-life studies. For example, the test can be stopped if overstress is detected, the test can be adjusted to increase monitoring on existing monitored inferential variables, or the test can be adjusted to add additional inferential variables to be monitored.

Note that although the specification is described in terms of using current time-series, any inferential variable can be monitored. In some embodiments, these inferential variables are received from real-time telemetry system 104. In some embodiments, the inferential variables received from the sensors include one or more of: hardware variables; and software variables. In some embodiments, the hardware variables include one or more of: voltage; current; temperature; vibration; optical power; optical wavelength; air velocity; measures of signal integrity (e.g., signal/noise ratio, a bit-error rate, the number of times an operation in the component is retried, the size of an eye-diagram opening, the height of the eye-diagram opening, the width of the eye-diagram opening, etc.); and fan speed. In some embodiments the software variables include one or more of: throughput; transaction latencies; queue lengths; central processing unit load; memory load; cache load; I/O traffic; bus saturation metrics; FIFO overflow statistics; network traffic; and disk-related metrics.

Detecting Multiple Anomalies in Clusters of Components

In some embodiments, the N components being monitored are coupled in series. In doing so, the number of sensors required to monitor a given inferential variable is reduced. For example, for components undergoing accelerated-life studies, a decrease in the current I(t) can indicate that one or more components is at the onset of failure. Similarly, for complex computer systems, an increase in the execution time for a given process can indicate that one or more computer systems are at the onset of failure. Moreover, for routing resources, an increase in latency can indicate that one or more routing resources are at the onset of degradation. Hence, by monitoring these inferential variables, the number of sensors can be reduced from N to 1.

Figure 2:
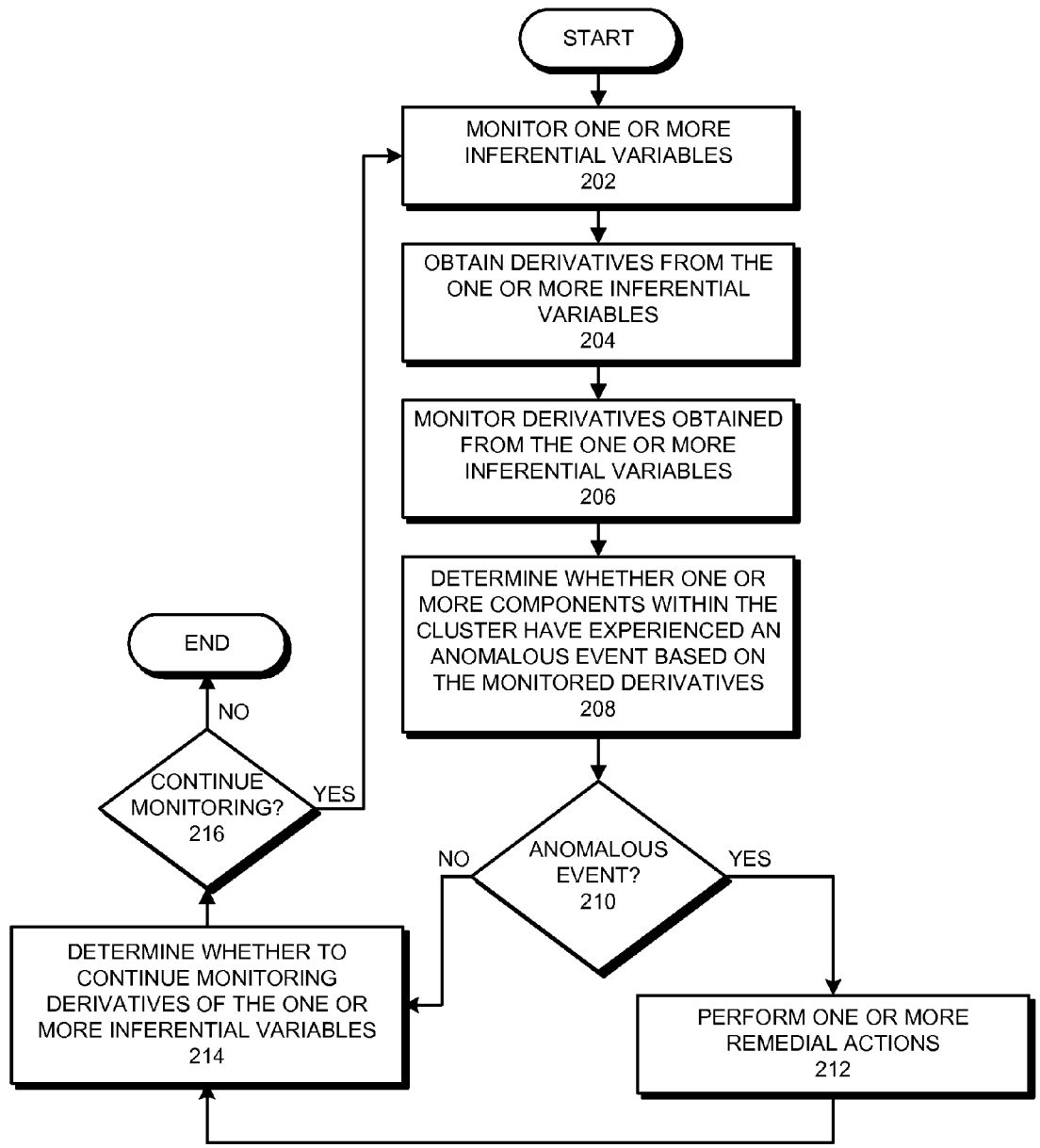
FIG. 2 presents a flow chart illustrating a process of detecting multiple anomalies in a cluster of components in accordance with an embodiment of the present invention.

FIG. 2 presents a flow chart illustrating the process of detecting multiple anomalies in a cluster of components in accordance with an embodiment of the present invention. The process begins when the system monitors one or more inferential variables (step 202) which are received from sensors in the cluster of components. Next, the system obtains derivatives from the one or more inferential variables (step 204). In some embodiments, while obtaining the derivatives from the one or more inferential variables, the system uses a moving-window numerical derivative technique which calculates the rate-of-change in the one or more inferential variables over a specified time interval. In some embodiments, for inferential variables which have derivatives which can be measured directly, steps 202 and 204 are not performed. In these embodiments, these inferential variables are measured directly using a sensor. For example, the derivative of current can be measured directly using capacitive or inductive detection techniques.

Returning to FIG. 2, the system then monitors derivatives obtained from the one or more inferential variables (step 206). Next, the system determines whether one or more components within the cluster have experienced an anomalous event based on the monitored derivatives (step 208). In some embodiments, the anomalous event includes: a failure event, a fault event, and a recovery event. If so (step 210, yes), the system performs one or more remedial actions (step 212). In some embodiments, the one or more remedial actions includes one or more of: generating warnings; replacing failed components; reporting the actual number of components that have failed; reporting the probability that a specified number of components have failed; monitoring additional variables monitored by sensors in the cluster of components; adjusting the frequency at which the one or more variables are polled by the sensors; adjusting test conditions during an accelerated-life study of the components; scheduling the failed components to be replaced at the next scheduled maintenance interval; and estimating the remaining useful life of the components. Note that other remedial actions not listed above can be also performed.

If the system determines that one or more components within the cluster have not experienced an anomalous event (step 210, no) or after the system performs one or more remedial actions (step 212), the system determines whether to continue monitoring derivatives of the one or more inferential variables (step 214). If so (step 216, yes), the system returns to step 202. Otherwise (step 216, no), the process ends.

Figure 3:
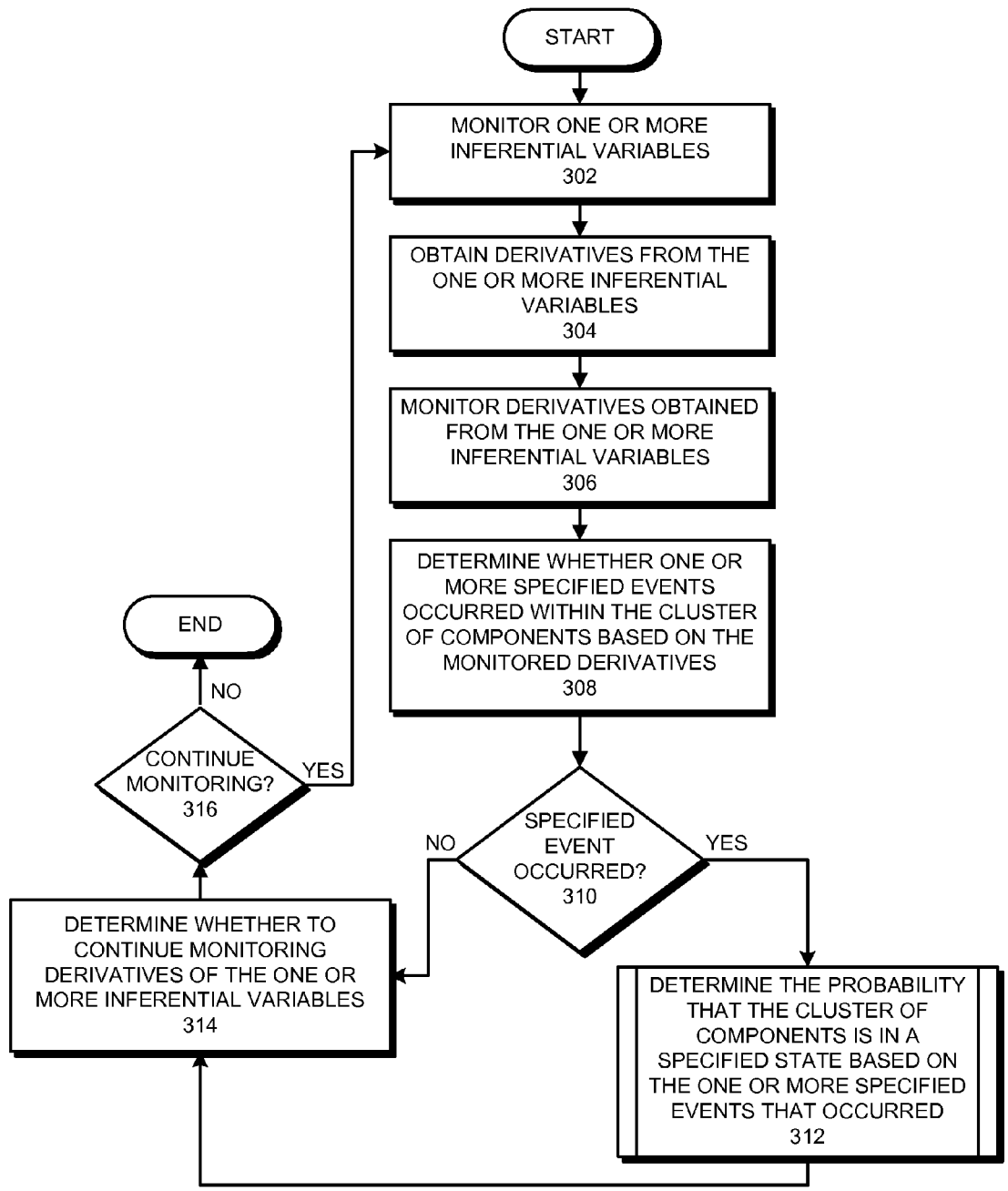
FIG. 3 presents a flow chart illustrating another process of detecting multiple anomalies in a cluster of components in accordance with an embodiment of the present invention.

FIG. 3 presents a flow chart illustrating another process of detecting multiple anomalies in a cluster of components in accordance with an embodiment of the present invention. The process begins when the system monitors one or more inferential variables (step 302) which are received from sensors in the cluster of components. Next, the system obtains derivatives from the one or more inferential variables (step 304). The system then monitors derivatives obtained from one or more inferential variables (step 306) which are received from sensors in the cluster of components.

Next, the system determines whether one or more specified events occurred within the cluster of components based on the monitored derivatives (step 308). If so (step 310, yes), the system determines the probability that the cluster of components is in a specified state based on the one or more specified events that occurred (step 312). Note that step 312 is described in more detail with reference to FIG. 5 below.

If the system determines that one or more specified events have not occurred within the cluster of components (step 310, no) or after the system determines the probability that the cluster of components is in a specified state based on the one or more specified events that occurred (step 312), the system determines whether to continue monitoring derivatives of the one or more inferential variables (step 314). If so (step 316, yes), the system returns to step 302. Otherwise (step 316, no), the process ends.

In some embodiments, steps 302 and 304 are not performed. In these embodiments, the derivatives of the one or more inferential variables are monitored directly from the sensors within the cluster of components.

Figure 4:
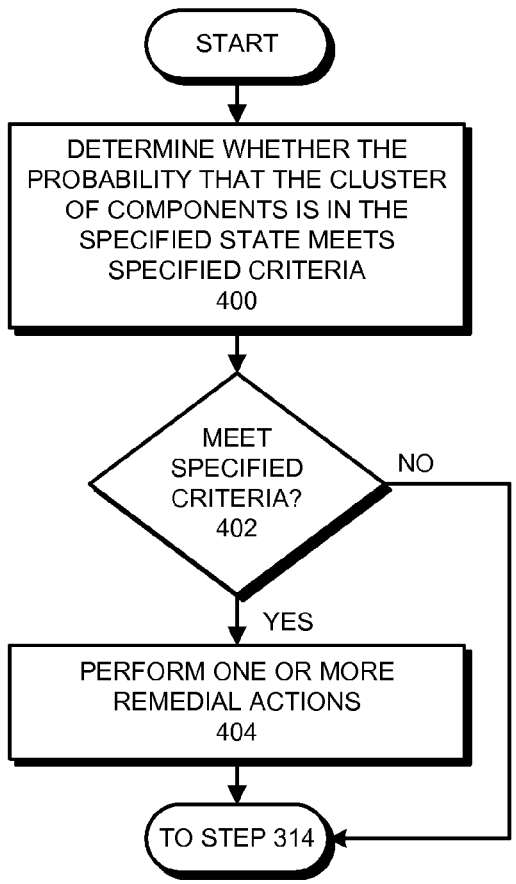
FIG. 4 presents a flow chart illustrating a process of performing one or more remedial actions in accordance with an embodiment of the present invention.

FIG. 4 presents a flow chart illustrating a process of performing one or more remedial actions in accordance with an embodiment of the present invention. This process begins after the system determines the probability that the cluster of components is in a specified state (e.g., step 312 in FIG. 3). The process begins when the system determines whether the probability that the cluster of components is in the specified state meets specified criteria (step 400). For example, the system can determine that the specified criteria is met when the probability that the cluster of components is in state 1 exceeds 10% but the probability that the cluster of components is in state 2 is below 50%. If so (step 402, yes), the system performs one or more remedial actions (step 404). For example, the system can perform one or more of the remedial actions described above. After the system performs one or more remedial actions (step 404) or if the system determines that the probability that the cluster of components is in the specified state does not meet specified criteria (step 402, no), the system continues to step 314 in FIG. 3.

In some embodiments, the one or more specified events include one or more of: a first event wherein the value of the inferential variable is increasing; and a second event wherein the value of the inferential variable is decreasing.

Figure 5:
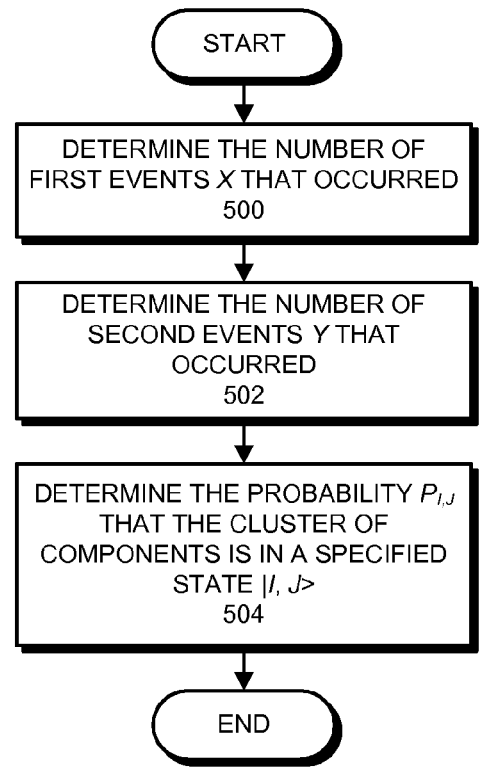
FIG. 5 presents a flow chart illustrating a process of determining the probability that the cluster of components is in a specified state in accordance with an embodiment of the present invention.

FIG. 5 presents a flow chart illustrating a process of determining the probability that the cluster of components is in a specified state in accordance with an embodiment of the present invention. The process begins when the system determines the number of first events x that occurred (step 500).

Next, the system determines the number of second events y that occurred (step 502). The system then determine the probability $p_{i,j}$ that the cluster of components is in a specified state |i,j> as:

$$p_{i,j} = \frac{|a'_{i,j}|^2}{\sum_{k,l}|a'_{k,l}|^2}$$

(step 504), where $a'_{i,j}$ is the coefficient associated with the specified state |i,j>, wherein $-y \leq i \leq x$ and $-x \leq j \leq y$, $-y \leq k \leq x$ and $-x \leq l \leq y$; and $$\sum_{i,j} p_{i,j} = 1.$$

Note that i, j, k and l are counting indices.

In some embodiments, a Sequential Probability Ratio Test (SPRT) is used to monitor the derivative of the inferential variable time series to identify the onset time and completion time of component degradation and/or failure. Note that if the normal operation is defined in terms of the inferential variable itself (e.g., I(t)) instead of the derivative of the inferential variable (e.g., I'(t)), the SPRT alarms corresponding to the signal (i.e., SPRT 1 and SPRT 2) must be reset after each degradation or fault event, or recurring training periods for the inferential variable must be performed after each degradation or fault event. Thus, monitoring the derivative of the inferential variable is beneficial because the extra processing required after each degradation/failure event does not need to be performed.

In some embodiments, data gathered from this technique can be combined with post-stress-test physical characterization analyses to gain further insights into the physics of failure of the subsystems (or components) of interest, and/or to build a library which can be used to determine one or more remedial actions to be performed.

Embodiments of the present invention allow the constraints on the trade-off between the number of subsystems (or components) of interest being monitored and the number of detectors and signals being monitored to be reduced, while yielding higher-resolution information on the dynamic evolution of the health and degradation processes of the components as a function of cumulative stress (or workload). These embodiments can:

(1) detect the time of anomaly onset in any individual component under surveillance, even when the overall functionality of that component cannot be measured directly;
(2) detect the time of anomaly completion in any individual component under surveillance, even when the overall functionality of that component cannot be measured directly;
(3) account for available system resources (operational subsystems or components) at any time; and/or
(4) alter the status of the system or test in various manners: (a) stop the test if over-stress is indicated, (b) increase monitoring or (c) add additional inferential variables to monitor.

Hence, the above-described technique is beneficial because it can detect the exact times of the onset of the degradation and/or failure for individual components undergoing reliability studies with substantially minimal telemetry resources. Furthermore, the above-described technique enables in-situ (live) assessment of operational subsystems (or components) within a complex system (such as a cluster of computer systems or network switches).

Exemplary Implementation

Note that the following exemplary implementation is described in terms of the current I(t) and the derivative of the current I'(t). However, the exemplary implementation can be applied to any of the inferential variables described above.

Definitions of Defect Categories

In some embodiments, the alarms associated with the changes in the signal derivative, SPRT5 & SPRT6, correspond to the occurrences of two types of anomalies. The first type of anomaly can be referred to as a Type 1 defect, $d_1$, and causes an increase of the inferential signal. This change can be captured by an SPRT5 alarm, when the derivative of the inferential signal becomes positive, from its quiescent value of zero (as shown in FIG. 7A). The second type of anomaly can be classified as a Type 2 defect, $d_2$, and causes a decrease of the inferential signal (as shown in FIG. 7B). This change can be captured by an SPRT6 alarm, when the derivative of the inferential signal becomes negative. In some embodiments, Type 1 and Type 2 defects are reversible, and recovery events (e.g., self-healing, self-repair, self-resets, etc.) are possible. A recovery event of Type 1 can trigger an SPRT6 alarm (as shown in FIG. 7B), while a recovery event of Type 2 can trigger an SPRT5 alarm (as shown in FIG. 7A).

System State and Method to Monitor System State

Figure 6:
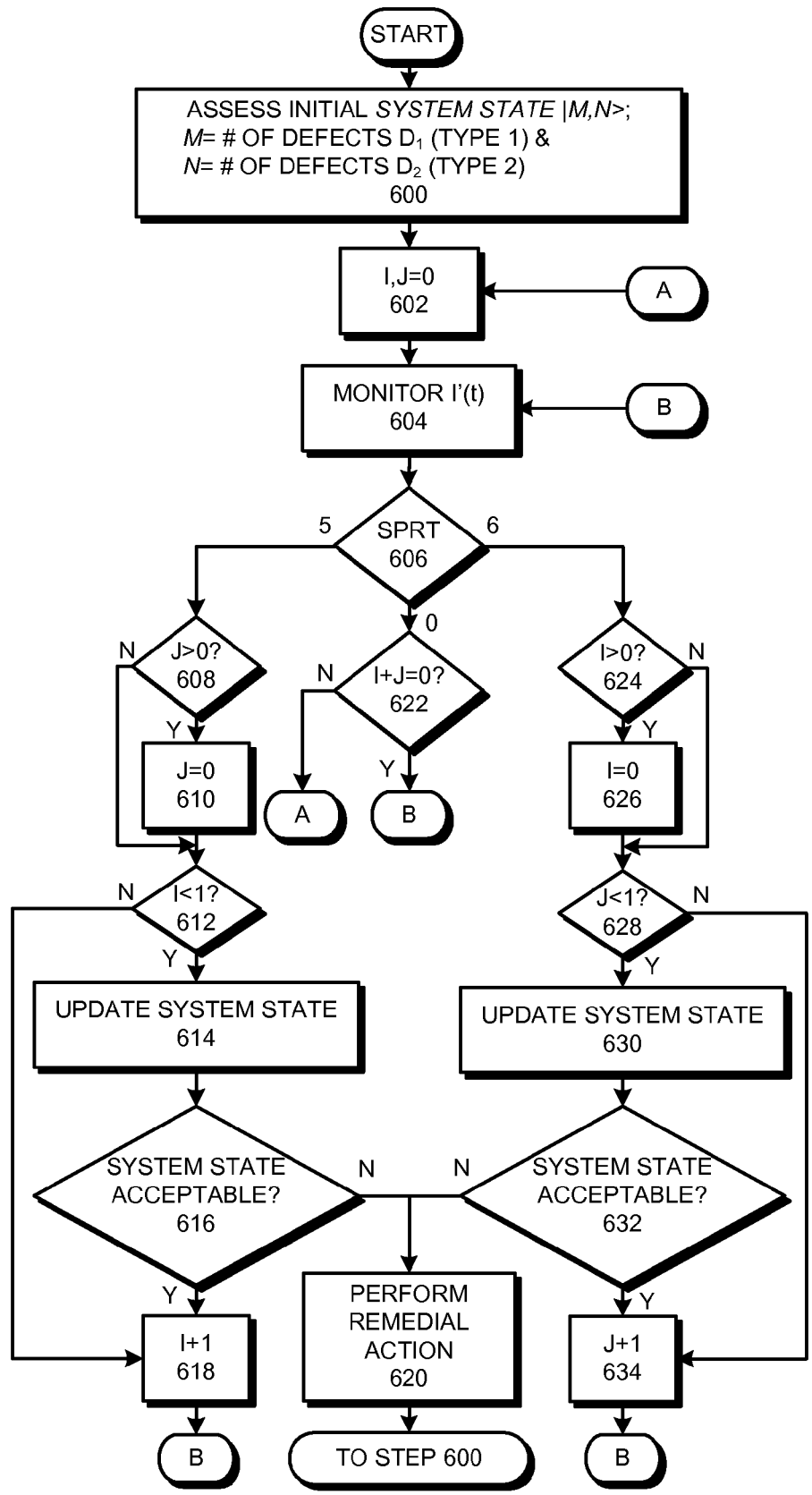
FIG. 6 presents a flow chart illustrating an exemplary process of detecting multiple anomalies in a cluster of components in accordance with an embodiment of the present invention.

The flow chart in FIG. 6 illustrates an exemplary technique for monitoring the state of a complex system in terms of the current count of Type 1 and Type 2 defects. At step 600, the system assesses the initial state of the system (e.g., initialization step). The initial numbers m and n of Type 1 and Type 2 defects, respectively, are recorded. This can be denoted using the following compact notation for the state of the system: |m,n>. The count of Type 1 defects is listed first, on the left side of the |m,> bracket, while the count of Type 2 defects is listed second, on the right side of the |,n> bracket. In some embodiments, the monitoring process is started when there are no defects present, m=0 and n=0 (e.g., this occurs for a new or newly repaired system). The state containing no defects can be referred to as the system ground state, |0,0>. Furthermore, the monitoring process may be initiated at an arbitrary time in the life of a complex system; therefore, the initial defect count may be finite, such that in general $m \geq 0$ and $n \geq 0$.

Next, the system sets the counting indices i and j to zero (step 602). The system then monitors I'(t) (step 604). Next, the system determines whether an SPRT alarm is generated. If no SPRT alarm is generated (step 606, 0), the system determines whether i+j=0 (step 622). If so, (step 622, Y), the system returns to step 604. Otherwise (step 622, N), the system returns to step 602.

If at step 606, the system determines that an SPRT 5 alarm is generated (step 606, 5), the system determines whether j>0 (step 608). If so (step 608, Y), the system sets j=0 (step 610). After the system sets j=0 (step 610) or after the system determines that $j \leq 0$ (step 608, N), the system determines whether i<1 (step 612). If so (step 612, Y), the system updates the system state (step 614).

The system then determines whether the system state is acceptable (step 616). If the system determines that the system state is acceptable (step 616, Y) or the system determines that $i \geq 1$ (step 612, N), the system increments i by 1 (step 618)

and returns to step 604. If the system determines that the system state is not acceptable (step 616, N), the system performs one or more remedial actions (step 620). The system then returns to step 600.

If at step 606, the system determines that an SPRT 6 alarm is generated (step 606, 6), the system determines whether i≧0 (step 624). If so (step 624, Y), the system sets i=0 (step 626). After the system sets i=0 (step 626) or after the system determines that i≦0 (step 624, N), the system determines whether j<1 (step 628). If so (step 628, Y), the system updates the system state (step 630).

The system then determines whether the system state is acceptable (step 632). If the system determines that the system state is acceptable (step 632, Y) or the system determines that j≧1 (step 628, N), the system increments j by 1 and returns to step 604. If the system determines that the system state is not acceptable (step 632, N), the system performs one or more remedial actions (step 620). The system then returns to step 600.

Note that in steps 632 and 616, while determining whether the system state is acceptable, the system can determine whether the probability that the system is in a specified state meets specified criteria. For example, if the probability that the system is in state 1 is greater than 10% and the probability that the system is in state 2 is less than 50%, the system can perform a remedial action.

The operations illustrated in FIG. 6 are described in more detail below.

Method to Update System State (Defect Counting Algebra)

Initial State with Arbitrary (but Finite) Defect Count m>0 & n>0

Some embodiments of the present invention use an event operator to determine the probability that the system is in a specified state. For example, during the event illustrated in FIG. 7A (enunciated by an SPRT5 alarm) the system transitions from an initial state with m Type 1 defects and n Type 2 defects, |m,n>, into either (i) a state containing one extra Type 1 defect, |m+1,n>, or (ii) a state containing one less Type 2 defect, |m,n−1>. That is equivalent to a failure event of Type 1, or a recovery event of Type 2. For m≧0 and n>0, the operator U defined below describes mathematically the event in FIG. 7A.

$$U|m,n> = c|m+1,n> + s|m,n-1> \quad (1)$$

After the application of operator U (occurrence of SPRT5 alarm) the new system state consists of a linear combination of possible defect counts, |m+1,n> and |m,n−1>. The coefficients in Eq. 1 are assigned such that:

$$|c|^2 + |s|^2 = 1 \quad (2)$$

The physical meaning of Eqs. 1 and 2 is that once the event operator U acts on the initial state |m,n>, the probability for the system to be in the final state |m+1,n> is equal to $|c|^2$, and the probability for the system to be in the final state |m,n−1> is equal to $|s|^2$. Moreover, the probability that the final system state be either |m+1,n> or |m,n−1> is equal to 1.

Similarly, during the event illustrated in FIG. 7B (enunciated by an SPRT6 alarm) the system transitions from an initial state with m Type 1 defects and n Type 2 defects, |m,n>, either (i) into a state containing one less Type 1 defect, |m−1,n>, or (ii) into a state containing one extra Type 2 defect, |m,n+1>. Again, that is equivalent to a recovery event of Type 1, or a failure event of Type 2. For m>0 and n≧0, the operator V defined below describes mathematically the event in FIG. 7B.

$$V|m,n> = s'|m-1,n> + c'|m,n+1> \quad (3)$$

After the application of operator V (occurrence of SPRT6 alarm) the new system state consists of a linear combination of possible defect counts, |m−1,n> and |m,n+1>. The coefficients in Eq. 3 are assigned such that:

$$|c'|^2 + |s'|^2 = 1 \quad (4)$$

The physical meaning of Eqs. 3 and 4 is that once the event operator V acts on the initial state |m,n>, the probability for the system to be in the final state |m−1,n> is equal to $|c'|^2$, and the probability for the system to be in the final state |m,n+1> is equal to $|s'|^2$. Moreover, the probability that the final system state can be either |m−1,n> or |m,n+1> is equal to 1.

Note that one could assess deterministically the final system state (e.g., after the onset of an SPRT5 alarm) by stopping the monitoring process and inspecting every system component, thus determining with certainty which of the states |m+1,n> or |m,n−1> the system is in. The advantage of embodiments of the present invention is that one is able to assess probabilistically the final system state without interrupting the monitoring process. Moreover, the method summarized by Eqs. 1-4 allows for the probabilistic estimation of the final system state (even when multiple SPRT5 and SPRT6 alarms occur) by sequentially applying the event-operators U and V (Eqs. 1 and 3) as discussed below. Finally, the probability ratio between a Type 1 failure event and a Type 2 recovery (see Eq. 1) is not necessarily equivalent to the probability ratio between a Type 1 recovery event and a Type 2 failure event (e.g., Eq. 3), even though they could be. Therefore, the set of equalities c=c' and s=s', or c=s' and s=c' are not required to be true. See the limiting cases discussed below.

The results obtained from Eqs. 1 and 3 are summarized in Table 1.

TABLE 1

| Initial defect combination | Event | Final defect combination | Coefficient |
|---|---|---|---|
| \|m, n> | U | \|m + 1, n> | c |
|  |  | \|m, n − 1> | s |
|  | V | \|m − 1, n> | s' |
|  |  | \|m, n + 1> | c' |

FIG. 8A illustrates a situation where an SPRT5 alarm is followed at a later time by an SPRT6 alarm. By sequentially applying the operators U, then V to the initial system state |m,n>, one can assess probabilistically the final system state of the system.

Using Eqs. 1 and 3, one obtains:

$$\begin{aligned} VU|m,n> &= V(U|m,n>) \\ &= V(c|m+1,n> + s|m,n-1>) \\ &= cV|m+1,n> + sV|m,n-1> \\ &= c(s'|m,n> + c'|m+1,n+1>) + \\ &\quad s(s'|m-1,n-1> + c'|m,n>) \\ &= s's|m-1,n-1> + (c's + s'c)|m,n> + \\ &\quad c'c|m+1,n+1> \end{aligned} \quad (5)$$

FIG. 8B illustrates a situation where an SPRT6 alarm is followed at a later time by an SPRT5 alarm. Similar to Eq. 5, one can also show that:

$$UV|m,n> = VU|m,n> \quad (6)$$

The results obtained from Eqs. 5 and 6 are summarized in Table 2.

TABLE 2

| Initial defect combination | Events | Final defect combination | Coefficient |
|---|---|---|---|
| $\|m, n\rangle$ | UV or VU | $\|m-1, n-1\rangle$ $\|m, n\rangle$ $\|m+1, n+1\rangle$ | s's $(sc' + s'c)$ c'c |

Based on the results summarized in Table 2, the events illustrated in FIGS. 8A-8B render 3 possible defect combinations in the final system state: (i) $\|m+1,n+1\rangle$ wherein the system acquires 1 extra Type 1 defect and 1 extra Type 2 defect; (ii) $\|m,n\rangle$ wherein the system returns to the initial state after it went through a Type 1 failure followed by a Type 1 recovery, or a Type 2 recovery followed by a Type 2 failure; (iii) $\|m-1,n-1\rangle$ wherein the system sheds one Type 1 defect and one Type 2 defect. The probability of each final defect count (i)-(iii) is proportional to the square of the coefficient for the respective terms in Table 2.

FIG. 9A illustrates a situation where an SPRT5 alarm is followed at a later time by an SPRT6 alarm, which is then followed by another SPRT6 alarm, then the event sequence ends with an SPRT5 alarm. By sequentially applying the operators U, V, V, U to the initial system state $\|m,n\rangle$, one can assess probabilistically the final system state of the system.

Using Eqs. 1 and 3 and performing the calculation in the manner detailed by Eq. 5 above, one obtains the results summarized in Table 3. FIG. 9B illustrates a situation where an SPRT6 alarm is followed at a later time by an SPRT5 alarm, which is then followed by another SPRT5 alarm, then the event sequence ends with an SPRT6 alarm. The results corresponding to FIG. 9B are also summarized in Table 3.

Based on the results summarized in Table 3, the events illustrated in FIGS. 9A-9B render 5 possible defect combinations in the final system state: (i) $\|m+2,n+2\rangle$ wherein the system acquires 2 extra Type 1 defects and 2 extra Type 2 defects; (ii) $\|m+1,n+1\rangle$ wherein the system acquires 1 extra Type 1 defect and 1 extra Type 2 defect; (iii) $\|m,n\rangle$ wherein the system returns to the initial state after it went through several Type 1 and 2 failures and recoveries; (iv) $\|m-1,n-1\rangle$ wherein the system sheds 1 Type 1 defect and 1 Type 2 defect; (v) $\|m-2,n-2\rangle$ wherein the system sheds 2 Type 1 defects and 2 Type 2 defects. The probability of each final defect count (i)-(v) is proportional to the square of the coefficient for the respective terms in Table 3.

TABLE 3

| Initial defect combination | Event | Final defect combination | Coefficient |
|---|---|---|---|
| $\|m, n\rangle$ | UVVU or VUUV | $\|m-2, n-2\rangle$ $\|m-1, n-1\rangle$ $\|m, n\rangle$ $\|m+1, n+1\rangle$ $\|m+2, n+2\rangle$ | $s'^2 s^2$ $2(s^2 s'c' + s'^2 sc)$ $(s'^2 c^2 + 4s'sc'c + s^2 c'^2)$ $2(scc'^2 + s'c'c^2)$ $c'^2 c^2$ |

A few limiting cases are discussed below.

Small Probability for Recovery Events: $\{|s|^2, |s'|^2, |s's|^2\} \ll 1$, $\{|c|^2, |c'|^2\} \approx 1$.

The effect of the events illustrated in FIGS. 8A-8B is summarized in Table 4.

TABLE 4

| Initial defect combination | Events | Final defect combination | Coefficient |
|---|---|---|---|
| $\|m, n\rangle$ | VU or UV | $\|m, n\rangle$ $\|m+1, n+1\rangle$ | $(c's + s'c)$ c'c |

Based on the results summarized in Table 4, the events illustrated in FIGS. 8A-8B render 2 possible defect combinations in the final system state: (i) $\|m+1,n+1\rangle$ wherein the system acquires 1 extra Type 1 defect and 1 extra Type 2 defect; (ii) $\|m,n\rangle$ wherein the system returns to the initial state after it went through a Type 1 failure followed by a Type 1 recovery, or a Type 2 recovery followed by a Type 2 failure. Note that the probability of final defect count (i) is much larger than the probability of final defect count (ii).

The effect of the events illustrated in FIGS. 9A-9B is summarized in Table 5.

TABLE 5

| Initial defect combination | Events | Final defect combination | Coefficient |
|---|---|---|---|
| $\|m, n\rangle$ | VUUV or UVVU | $\|m+1, n+1\rangle$ $\|m+2, n+2\rangle$ | $2(scc'^2 + s'c'c^2)$ $c'^2 c^2$ |

Based on the results summarized in Table 5, the events illustrated in FIGS. 9A-9B render 2 possible defect combinations in the final system state: (i) $\|m+2,n+2\rangle$ wherein the system acquires 2 extra Type 1 defects and 2 extra Type 2 defects; (ii) $\|m+1,n+1\rangle$ wherein the system acquires 1 extra Type 1 defect and 1 extra Type 2 defect; The probability of final defect count (i) is much larger than the probability of final defect count (ii).

(b) No Recovery Events Allowed: $s=s'=0$, $c=c'=1$.

Figure 7:
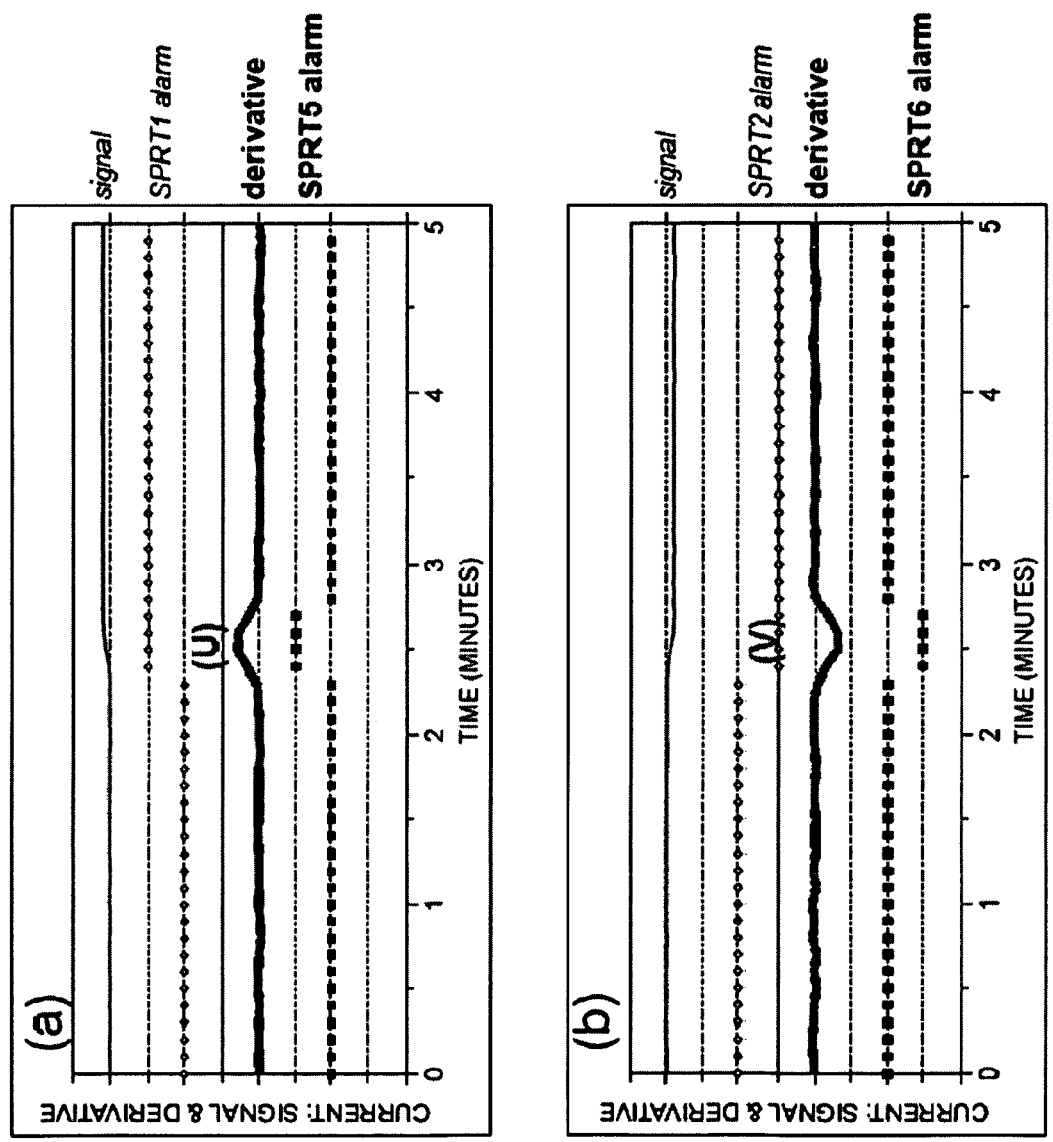
FIG. 7 presents exemplary graphs of a monitored telemetry signal and the derivative of the monitored telemetry signal in a system illustrating one anomalous event in accordance with an embodiment of the present invention.
Figure 8:
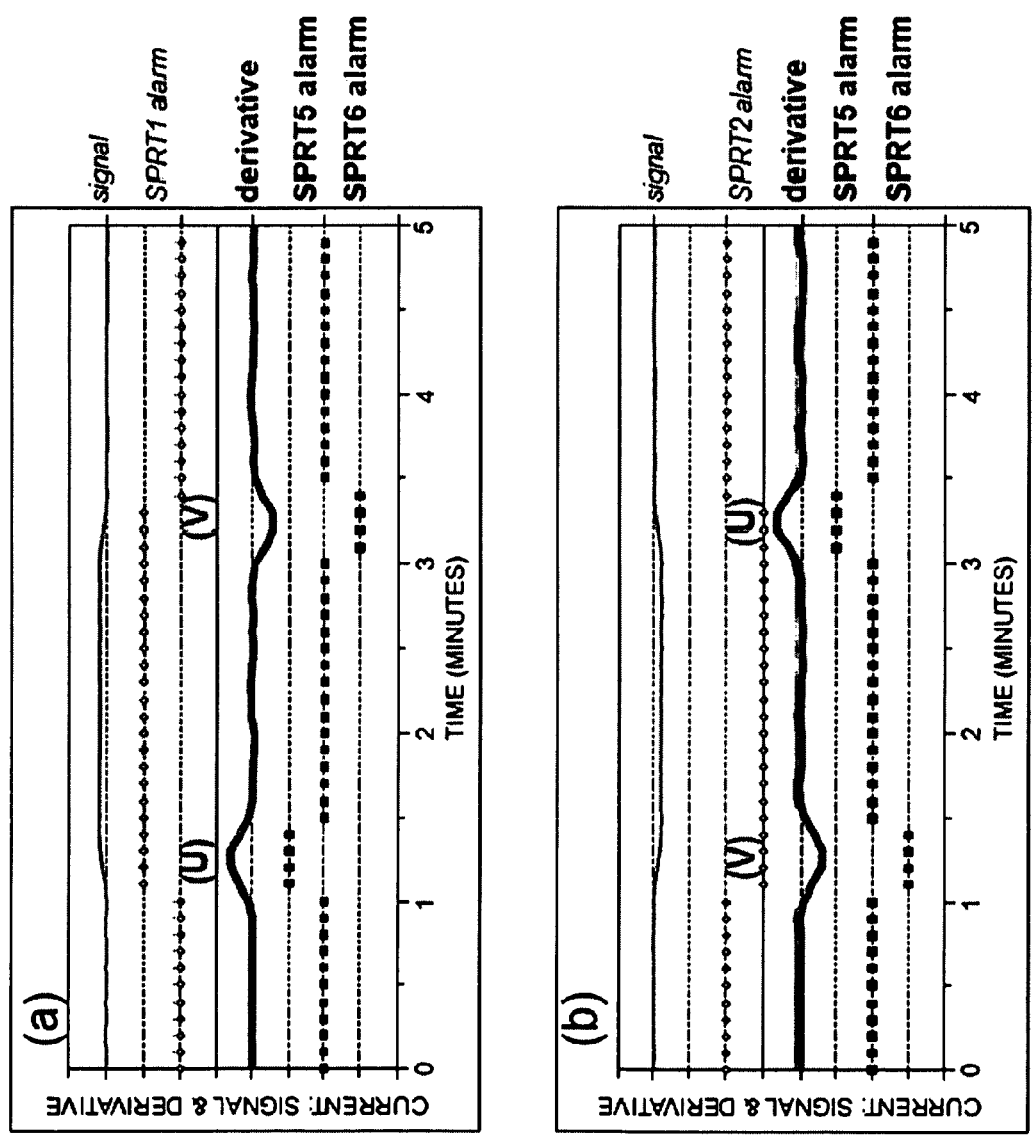
FIG. 8 presents exemplary graphs of a monitored telemetry signal and the derivative of the monitored telemetry signal in a system illustrating two anomalous events in accordance with an embodiment of the present invention.
Figure 9:
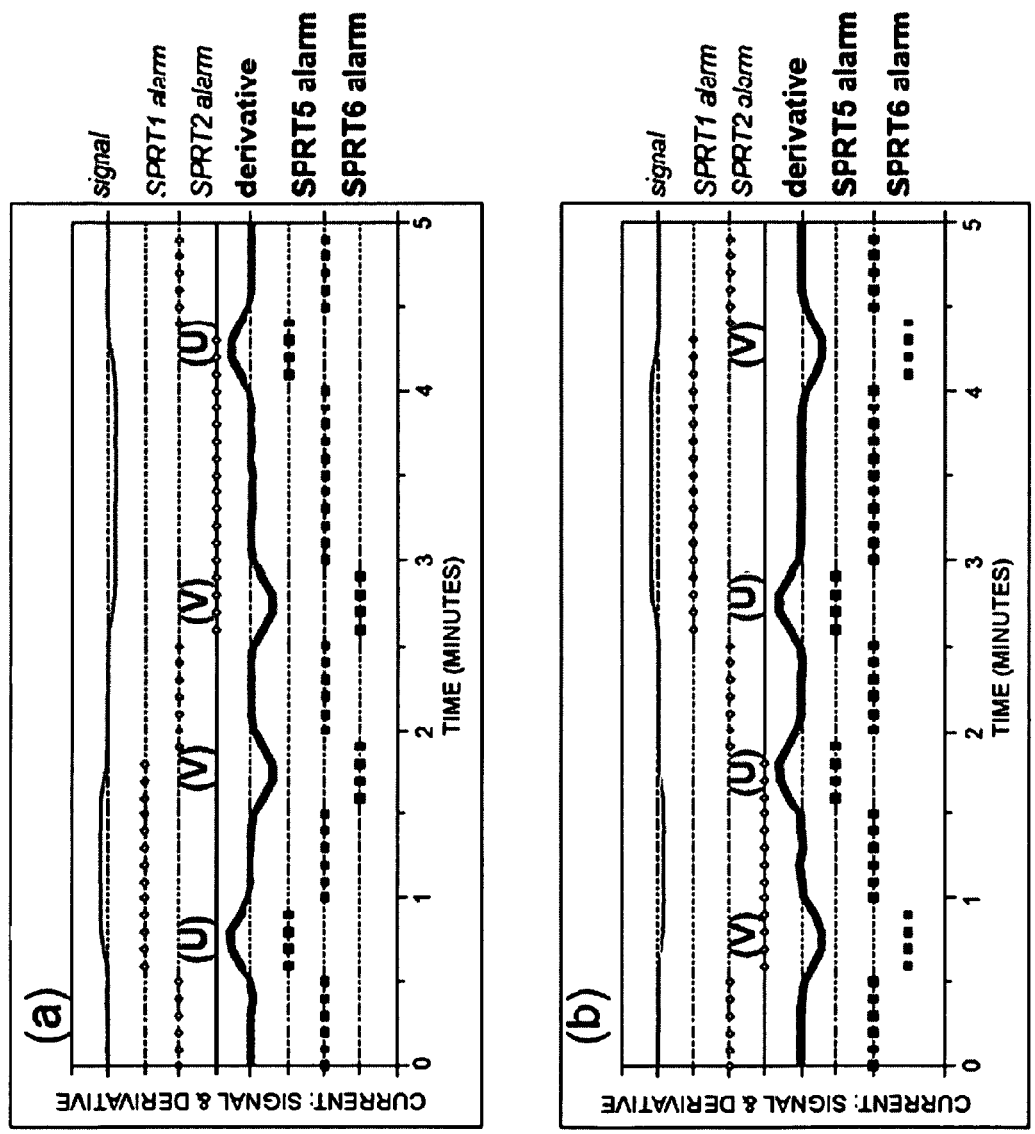
FIG. 9 presents exemplary graphs of a monitored telemetry signal and the derivative of the monitored telemetry signal in a system illustrating four anomalous events in accordance with an embodiment of the present invention.

The effect of the events illustrated in FIGS. 7-9 is summarized in Table 6.

Based on the results summarized in Table 6, one recognizes that the event-operators U and V correctly render the exact (deterministic) defect count of the final system state. For this limiting case, during each event U the system acquires 1 extra Type 1 defect; during each event V the system acquires 1 extra Type 2 defect. For each intermediary step, the probability of knowing the defect count is equal to 1; therefore, the assessment of the final system state is deterministic.

TABLE 6

| Initial defect combination | Events | Final defect combination | Coefficient |
|---|---|---|---|
| $\|m, n\rangle$ | U | $\|m+1, n\rangle$ | 1 |
|  | V | $\|m, n+1\rangle$ | 1 |
|  | VU or UV | $\|m+1, n+1\rangle$ | 1 |
|  | UVVU or VUUV | $\|m+2, n+2\rangle$ | 1 |

Figure 10:
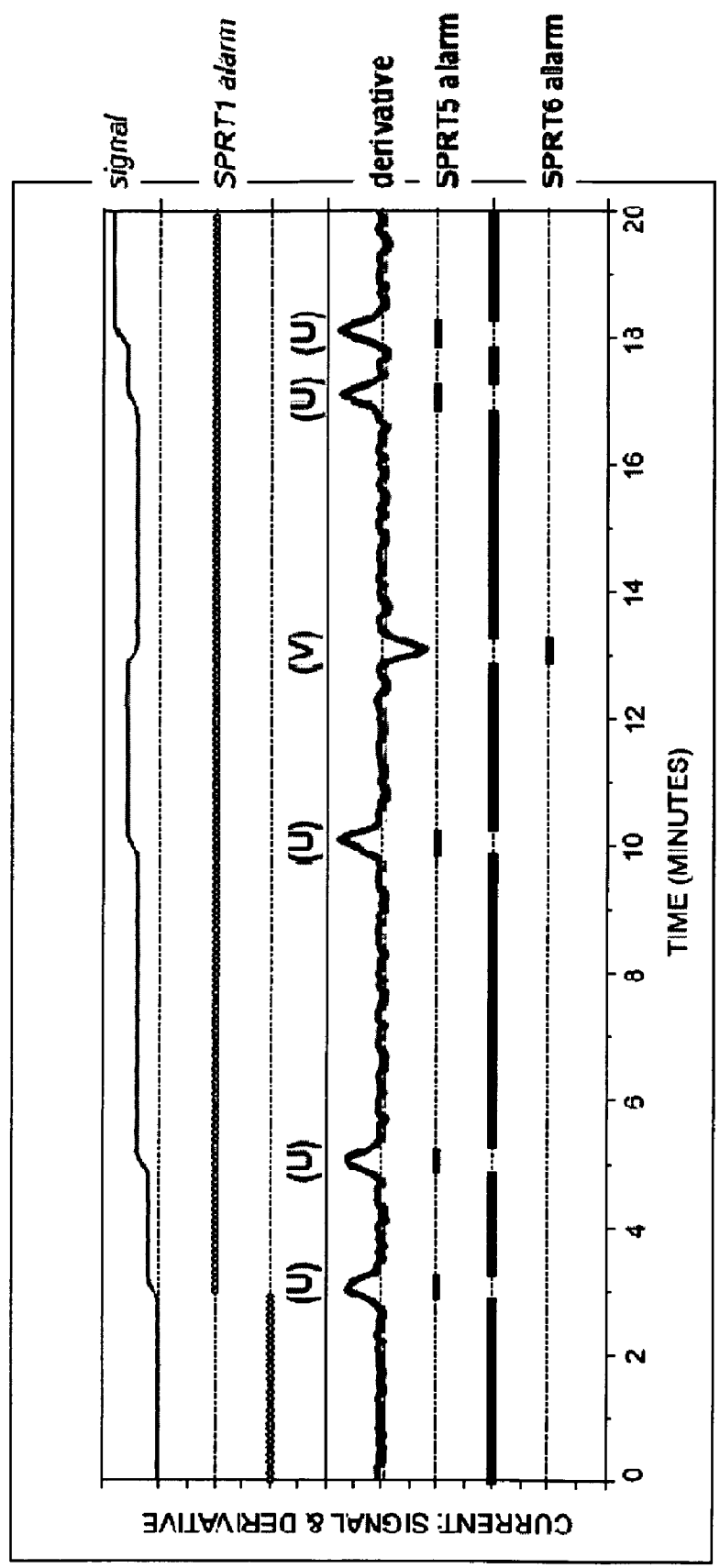
FIG. 10 presents exemplary graphs of a monitored telemetry signal and the derivative of the monitored telemetry signal in a system illustrating six anomalous events in accordance with an embodiment of the present invention.
Figure 11:
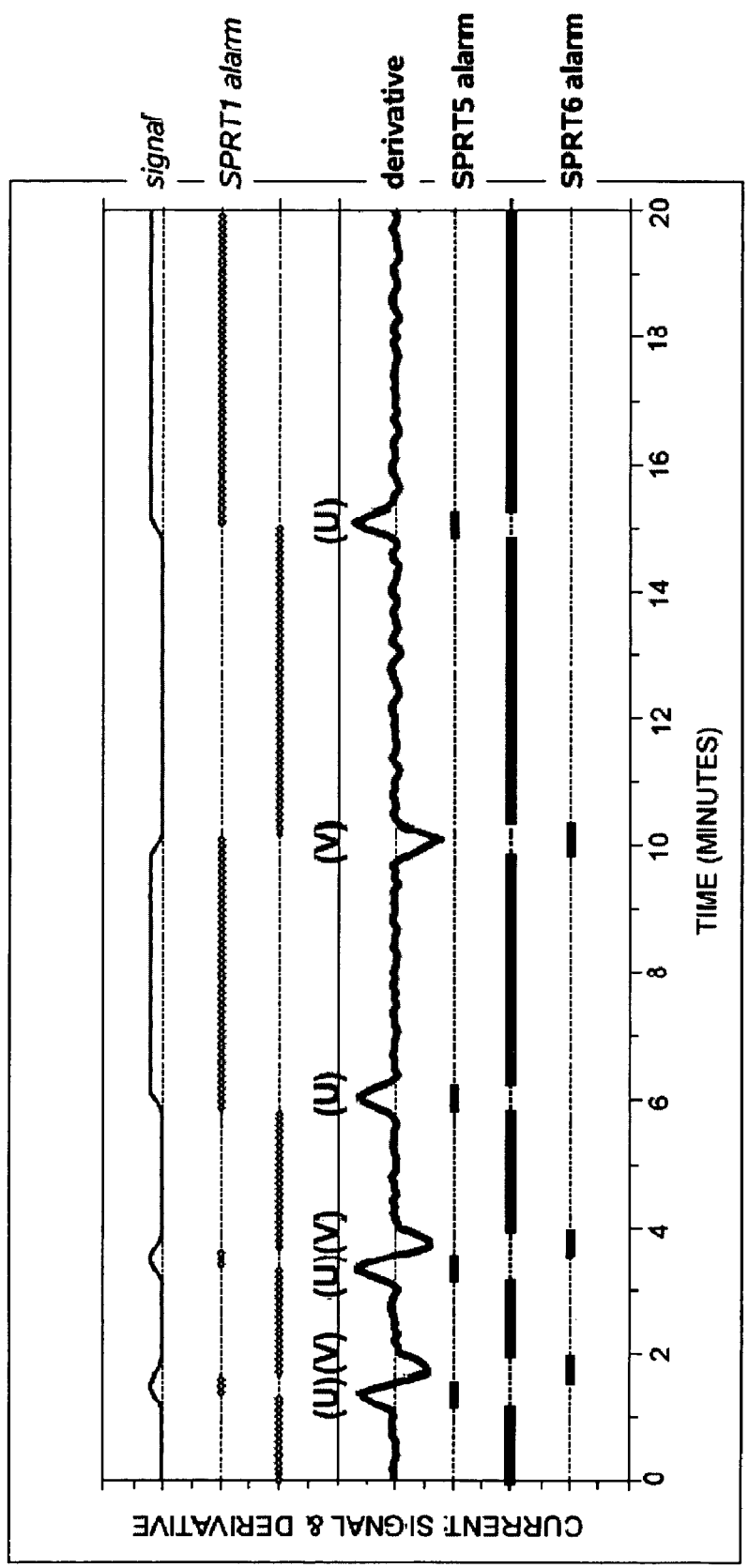
FIG. 11 presents exemplary graphs of a monitored telemetry signal and the derivative of the monitored telemetry signal in a system illustrating seven anomalous events in accordance with an embodiment of the present invention.

FIGS. 10-11 illustrate case histories of system monitoring wherein multiple resources/components became unavailable. The effect of the sequence of events shown in FIG. 10 is summarized in Table 7.

TABLE 7

| Initial defect combination | Events | Final defect combination | Coefficient | Probability |
|---|---|---|---|---|
| $\|m, n\rangle$ | UUUVUU | $\|m + 5, n + 1\rangle$ | 1 | 100% |

The effect of the sequence of events illustrated in FIG. 11 is summarized in Table 8.

TABLE 8

| Initial defect combination | Events | Final defect combination | Coefficient | Probability |
|---|---|---|---|---|
| $\|m, n\rangle$ | UVUVUVU | $\|m + 4, n + 3\rangle$ | 1 | 100% |

Based on the results summarized in Tables 6-8, one notices that by the time the system reaches its final state, it has acquired a number of additional Type 1 defects equal to the number of recorded U events, and a number of additional Type 2 defects equal to the number of recorded V events.

(c) No Defects of Type 2 Allowed: $c=s'=1$, $s=c'=0$.

When no Type 2 defects are permitted, the system state is defined as $|m,n=0\rangle \geq |m\rangle$, where m is the count of Type 1 defects. The effect of the events illustrated in FIGS. 7-9 is summarized in Table 9.

TABLE 9

| Initial defect count | Events | Final defect count | Coefficient |
|---|---|---|---|
| $\|m, 0\rangle = \|m\rangle$ | U | $\|m + 1\rangle$ | 1 |
| | V | $\|m - 1\rangle$ | 1 |
| | VU or UV | $\|m\rangle$ | 1 |
| | UVVU or VUUV | $\|m\rangle$ | 1 |

Based on the results summarized in Table 9, one recognizes that the event-operators U and V correctly render the exact (deterministic) defect count of the final system state. For this limiting case, during each event U, the system acquires one extra Type 1 defect and during each event V, the system sheds one Type 1 defect. For each intermediary step, the probability of knowing the defect count is equal to 1. Therefore, the assessment of the final system state is deterministic.

The effect of the sequence of events illustrated in FIG. 10 is summarized in Table 10.

TABLE 10

| Initial defect combination | Events | Final defect combination | Coefficient | Probability |
|---|---|---|---|---|
| $\|m\rangle$ | UUUVUU | $\|m + 4\rangle$ | 1 | 100% |

The effect of the sequence of events illustrated in FIG. 11 is summarized in Table 11.

TABLE 11

| Initial defect combination | Events | Final defect combination | Coefficient | Probability |
|---|---|---|---|---|
| $\|m\rangle$ | UVUVUVU | $\|m + 1\rangle$ | 1 | 100% |

Based on the results summarized in Tables 9-11, one notices that by the time the system reaches its final state, it has acquired a number of additional Type 1 defects equal to the difference between the number of recorded U and V events.

(d) Equal Probability Ratios for Failure & Recovery Between Defects $d_1$ & $d_2$: $c=c'$, $s=s'$.

The effect of the events illustrated in FIGS. 8A-8B is summarized in Table 12.

TABLE 12

| Initial defect combination | Events | Final defect combination | Coefficient |
|---|---|---|---|
| $\|m, n\rangle$ | UV or VU | $\|m - 1, n - 1\rangle$ | $s^2$ |
| | | $\|m, n\rangle$ | $2sc$ |
| | | $\|m + 1, n + 1\rangle$ | $c^2$ |

Based on the results summarized in Table 12, the events illustrated in FIGS. 8A-8B render 3 possible defect combinations in the final system state: (i) $|m+1,n+1\rangle$ wherein the system acquires 1 extra Type 1 defect and 1 extra Type 2 defect; (ii) $|m,n\rangle$ wherein the system returns to the initial state after it went through a Type 1 failure followed by a Type 1 recovery, or a Type 2 recovery followed by a Type 2 failure; (iii) $|m-1,n-1\rangle$ wherein the system sheds one Type 1 defect and one Type 2 defect. Note that the probability of each final defect count (i)-(iii) is proportional to the square of the coefficient for the respective terms in Table 12.

The effect of the events illustrated in FIGS. 9A-9B is summarized in Table 13.

TABLE 13

| Initial defect combination | Events | Final defect combination | Coefficient |
|---|---|---|---|
| $\|m, n\rangle$ | UVVU or VUUV | $\|m - 2, n - 2\rangle$ | $s^4$ |
| | | $\|m - 1, n - 1\rangle$ | $4s^3c$ |
| | | $\|m, n\rangle$ | $6s^2c^2$ |
| | | $\|m + 1, n + 1\rangle$ | $4sc^3$ |
| | | $\|m + 2, n + 2\rangle$ | $c^4$ |

Based on the results summarized in Table 13, the events illustrated in FIGS. 9A-9B render 5 possible defect combinations in the final system state: (i) $|m+2,n+2\rangle$ wherein the system acquires 2 extra Type 1 defects and 2 extra Type 2 defects; (ii) $|m+1,n+1\rangle$ wherein the system acquires 1 extra Type 1 defect and 1 extra Type 2 defect; (iii) $|m,n\rangle$ wherein the system returned to the initial state after it went through several Type 1 and 2 failures and recoveries; (iv) $|m-1,n-1\rangle$ wherein the system sheds one Type 1 defect and one Type 2 defect; (v) $|m-2,n-2\rangle$ wherein the system sheds 2 Type 1 defects and 2 Type 2 defects. Note that the probability of each final defect count (i)-(v) is proportional to the square of the coefficient for the respective terms in Table 13.

(e) Equal Probabilities for Failure & Recovery for Defects $d_1$ & $d_2$: $c=s=1/\sqrt{2}$, $c'=s'=1/\sqrt{2}$.

The effect of the events illustrated in FIGS. 7A-7B is summarized in Table 14.

TABLE 14

| Initial defect combination | Event | Final defect combination | Coefficient | Probability |
|---|---|---|---|---|
| $\|m, n\rangle$ | U | $\|m + 1, n\rangle$ | $1/\sqrt{2}$ | 50% |
| | | $\|m, n - 1\rangle$ | $1/\sqrt{2}$ | 50% |
| | V | $\|m - 1, n\rangle$ | $1/\sqrt{2}$ | 50% |
| | | $\|m, n + 1\rangle$ | $1/\sqrt{2}$ | 50% |

Based on the results summarized in Table 14, after an event U there is 50% probability the system could end up in a state containing 1 extra Type 1 defect; and 50% probability in a state containing 1 less Type 2 defect. After an event V there is 50% probability the system could end up in a state containing 1 less Type 1 defect; and 50% probability in a state containing 1 extra Type 2 defect.

The effect of the events illustrated in FIGS. 8A-8B is summarized in Table 15.

TABLE 15

| Initial defect combination | Events | Final defect combination | Coefficient | Probability |
|---|---|---|---|---|
| $\|m, n\rangle$ | UV | $\|m - 1, n - 1\rangle$ | 1/2 | 17% |
| | or | $\|m, n\rangle$ | 1 | 66% |
| | VU | $\|m + 1, n + 1\rangle$ | 1/2 | 17% |

Based on the results summarized in Table 15, the events illustrated in FIGS. 8A-8B render 3 possible defect combinations in the final system state: (i) $\|m+1,n+1\rangle$ wherein the system acquires 1 extra Type 1 defect and 1 extra Type 2 defect; (ii) $\|m,n\rangle$ wherein the system returns to the initial state after it went through a Type 1 failure followed by a Type 1 recovery, or a Type 2 recovery followed by a Type 2 failure; (iii) $\|m-1,n-1\rangle$ wherein the system sheds one Type 1 defect and one Type 2 defect. Note that the probability for each final defect count (i)-(iii) was obtained by dividing the square of each coefficient to the sum of the squares of coefficients as shown in the equations below:

Sum of squares of coefficients=(1/4+1+1/4)=3/2

Probability (i) & (iii)=(1/4)/(3/2)=1/6

Probability (ii)=1/(3/2)=2/3    (7)

The effect of the events illustrated in FIGS. 9A-9B is summarized in Table 16.

TABLE 16

| Initial defect combination | Events | Final defect combination | Coefficient | Probability |
|---|---|---|---|---|
| $\|m, n\rangle$ | UVVU | $\|m - 2, n - 2\rangle$ | 1/4 | 1.5% |
| | or | $\|m - 1, n - 1\rangle$ | 1 | 23% |
| | VUUV | $\|m, n\rangle$ | 3/2 | 51% |
| | | $\|m + 1, n + 1\rangle$ | 1 | 23% |
| | | $\|m + 2, n + 2\rangle$ | 1/4 | 1.5% |

Based on the results summarized in Table 16, the events illustrated in FIGS. 9A-9B render 5 possible defect combinations in the final system state: (i) $\|m+2,n+2\rangle$ wherein the system acquires 2 extra Type 1 defects and 2 extra Type 2 defects; (ii) $\|m+1,n+1\rangle$ wherein the system acquires 1 extra Type 1 defect and 1 extra Type 2 defect; (iii) $\|m,n\rangle$ wherein the system returns to the initial state after it went through several Type 1 and 2 failures and recoveries; (iv) $\|m-1,n-1\rangle$ wherein the system sheds one Type 1 defect and one Type 2 defect; (v) $\|m-2,n-2\rangle$ wherein the system sheds 2 Type 1 defects and 2 Type 2 defects. Note that the probability of each final defect count (i)-(v) was calculated based on the technique presented in Eq. 7.

The effect of the sequence of events illustrated in FIG. 10 is summarized in Table 17.

TABLE 17

| Initial defect combination | Events | Final defect combination | Coefficient | Probability |
|---|---|---|---|---|
| $\|m, n\rangle$ | UUUVUU | $\|m - 1, n - 5\rangle$ | 1/8 | 0.1% |
| | | $\|m, n - 4\rangle$ | 3/4 | 3.9% |
| | | $\|m + 1, n - 3\rangle$ | 15/8 | 24.4% |
| | | $\|m + 2, n - 2\rangle$ | 5/2 | 43.2% |
| | | $\|m + 3, n - 1\rangle$ | 15/8 | 24.4% |
| | | $\|m + 4, n\rangle$ | 3/4 | 3.9% |
| | | $\|m + 5, n + 1\rangle$ | 1/8 | 0.1% |

The effect of the sequence of events illustrated in FIG. 11 is summarized in Table 18.

TABLE 18

| Initial defect combination | Events | Final defect combination | Coefficient | Probability |
|---|---|---|---|---|
| $\|m, n\rangle$ | UVUVUVU | $\|m - 3, n - 4\rangle$ | $1/(8\sqrt{2})$ | 0.03% |
| | | $\|m - 2, n - 3\rangle$ | $7/(8\sqrt{2})$ | 1.43% |
| | | $\|m - 1, n - 2\rangle$ | $21/(8\sqrt{2})$ | 12.85% |
| | | $\|m, n - 1\rangle$ | $35/(8\sqrt{2})$ | 35.69% |
| | | $\|m + 1, n\rangle$ | $35/(8\sqrt{2})$ | 35.69% |
| | | $\|m + 2, n + 1\rangle$ | $21/(8\sqrt{2})$ | 12.85% |
| | | $\|m + 3, n + 2\rangle$ | $7/(8\sqrt{2})$ | 1.43% |
| | | $\|m + 4, n + 3\rangle$ | $1/(8\sqrt{2})$ | 0.03% |

Based on the results summarized in Tables 14-18, one concludes that if the initial state of the system was $\|m,n\rangle$ and the system went through k U event occurrences, and l V event occurrences, say satisfying $k \geq l$, then the possible defect combinations in the final state are $\|m-l,n-k\rangle$, $\|m-l+1,n-k+1\rangle$, ..., $\|m+k,n+l\rangle$. In general, the coefficient of the final defect combination $\|m+k-l+i,n+i\rangle$ is $a_{m+k-l+i,n+i}$ (the index i is an integer such that $-k \leq i \leq l$). The probability $p_{m+k-l+i,n+i}$ of encountering this defect combination $\|m+k-l+i,n+i\rangle$ in the final state is given by:

$$p_{m+k-l+i,n+i} = \frac{|a_{m+k-l+i,n+i}|^2}{\sum_{j=-k}^{l} |a_{m+k-l+j,n+j}|^2} \quad (8)$$

The probability to find one of the possible defect combinations in the final system state is 1:

$$\sum_{i=-k}^{l} p_{m+k-l+i,n+i} = 1 \quad (9)$$

Initial State with No Defects, m=0 & n=0 (Ground State)

During the event illustrated in FIG. 7A (enunciated by an SPRT5 alarm), the system transitions from the initial state with 0 Type 1 defects and 0 Type 2 defects, $|0,0\rangle$ (i.e., the ground state), into a state containing one Type 1 defect, $|1,0\rangle$. This transition is equivalent to a failure event of Type 1. The operator U defined below describes mathematically the event in FIG. 7A.

$U|0,0\rangle = |1,0\rangle$    (10)

After the application of operator U (occurrence of SPRT5 alarm) the new system state is $|1,0\rangle$, with 100% certainty.

Similarly, during the event illustrated in FIG. 7B (enunciated by an SPRT6 alarm), the system transitions from an initial state with 0 Type 1 defects and 0 Type 2 defects, $|0,0>$, into a state containing one Type 2 defect, $|0,1>$. This transition is equivalent to a failure event of Type 2. The operator V defined below describes mathematically the event in FIG. 7B.

$$V|0,0>=|0,1> \qquad (11)$$

After the application of operator V (occurrence of SPRT6 alarm) the new system state is $|0,1>$, with 100% certainty.

The results obtained from Eqs. 10 and 11 are summarized in Table 19.

TABLE 19

| Initial defect combination | Event | Final defect combination | Coefficient |
|---|---|---|---|
| $|0, 0>$ | U | $|1, 0>$ | 1 |
|  | V | $|0, 1>$ | 1 |

FIG. 8A illustrates a situation where an SPRT5 alarm is followed at a later time by an SPRT6 alarm. By sequentially applying the operators U, then V to the initial system state $|0,0>$, one can assess probabilistically the final system state of the system. Using Eqs. 10 and 3, one obtains:

$$VU|0, 0> = V(U|0, 0>) \qquad (12)$$
$$= V|1, 0>$$
$$= s'|0, 0> + c'|1, 1>$$

Similarly, for the events illustrated in FIG. 8B, using Eqs. 11 and 1 one obtains:

$$UV|0, 0> = U(V|0, 0>) \qquad (13)$$
$$= U|0, 1>$$
$$= c|1, 1> + s|0, 0>$$

The results obtained from Eqs. 12 and 13 are summarized in Table 20.

TABLE 20

| Initial defect combination | Events | Final defect combination | Coefficient |
|---|---|---|---|
| $|0, 0>$ | VU | $|0, 0>$ | s' |
|  |  | $|1, 1>$ | c' |
|  | UV | $|0, 0>$ | s |
|  |  | $|1, 1>$ | c |

Based on the results summarized in Table 20, the events illustrated in FIGS. 8A-8B render 2 possible defect combinations in the final system state: (i) $|1,1>$ wherein the system acquires 1 extra Type 1 defect and 1 extra Type 2 defect; (ii) $|0,0>$ wherein the system returns to the initial state after it went through a Type 1 failure followed by a Type 1 recovery, or a Type 2 failure followed by a Type 2 recovery. Note that the probability of each final defect count (i)-(ii) is proportional to the square of the coefficient for the respective terms in Table 20.

FIG. 9A illustrates a situation where an SPRT5 alarm is followed at a later time by an SPRT6 alarm, which is then followed by another SPRT6 alarm, then the event sequence ends with an SPRT5 alarm. By sequentially applying the operators U, V, V, U to the initial system state $|0,0>$, one can assess probabilistically the final system state of the system. Using the sets of Eqs. 1 and 3 and Eqs. 10 and 11, and performing the calculation using the technique detailed for Eqs. 12 and 13, one obtains the results summarized in Table 21. FIG. 9B illustrates a situation where an SPRT6 alarm is followed at a later time by an SPRT5 alarm, which is then followed by another SPRT5 alarm, then the event sequence ends with an SPRT6 alarm. The results corresponding to FIG. 9B are also summarized in Table 21.

TABLE 21

| Initial defect combination | Events | Final defect combination | Coefficient |
|---|---|---|---|
| $|0, 0>$ | UVVU | $|0, 0>$ | $(s's + s'sc')$ |
|  |  | $|1, 1>$ | $(s'c + s'c'c + sc'^2)$ |
|  |  | $|2, 2>$ | $c'^2 c$ |
|  | VUUV | $|0, 0>$ | $(s's + s'sc)$ |
|  |  | $|1, 1>$ | $(sc' + sc'c + s'c^2)$ |
|  |  | $|2, 2>$ | $c'c^2$ |

Based on the results summarized in Table 21, the events illustrated in FIGS. 9A-9B render 3 possible defect combinations in the final system state: (i) $|2,2>$ wherein the system acquires 2 extra Type 1 defects and 2 extra Type 2 defects; (ii) $|1,1>$ wherein the system acquires 1 extra Type 1 defect and 1 extra Type 2 defect; (iii) $|0,0>$ wherein the system returns to the initial state after it went through several Type 1 and 2 failures and recoveries. Note that the probability of each final defect count (i)-(iii) is proportional to the square of the coefficient for the respective terms in Table 21.

A few limiting cases are discussed below.

(a) Small Probability for Recovery Events: $\{|s|^2, |s'|^2, |s's|^2\} << 1$, $\{|c|^2, |c'|^2\} \approx 1$.

The effect of the events illustrated in FIGS. 9A-9B is summarized in Table 22.

TABLE 22

| Initial defect combination | Events | Final defect combination | Coefficient |
|---|---|---|---|
| $|0, 0>$ | UVVU | $|1, 1>$ | $(s'c + s'c'c + sc'^2)$ |
|  |  | $|2, 2>$ | $c'^2 c$ |
|  | VUUV | $|1, 1>$ | $(sc' + sc'c + s'c^2)$ |
|  |  | $|2, 2>$ | $c'c^2$ |

Based on the results summarized in Table 22, the events illustrated in FIGS. 9A-9B render 2 possible defect combinations in the final system state: (i) $|2,2>$ wherein the system acquires 2 extra Type 1 defects and 2 extra Type 2 defects; (ii) $|1,1>$ wherein the system acquires 1 extra Type 1 defect and 1 extra Type 2 defect. Note that the probability of final defect count (i) is much larger than the probability of final defect count (ii).

(b) No Recovery Events Allowed: $s=s'=0$, $c=c'=1$.

The effect of the events illustrated in FIGS. 8-9 is summarized in Table 23.

TABLE 23

| Initial defect combination | Events | Final defect combination | Coefficient |
|---|---|---|---|
| $|0, 0>$ | VU or UV | $|1, 1>$ | 1 |
|  | UVVU or VUUV | $|2, 2>$ | 1 |

For this limiting case, during each event U, the system acquires 1 extra Type 1 defect; during each event V, the system acquires 1 extra Type 2 defect. For each intermediary step, the probability of knowing the defect count is equal to 1. Therefore, the assessment of the final system state is deterministic.

FIGS. 10-11 illustrate case histories of system monitoring wherein multiple resources became unavailable. The effect of the sequence of events shown in FIG. 10 is summarized in Table 24.

TABLE 24

| Initial defect combination | Events | Final defect combination | Coefficient | Probability |
|---|---|---|---|---|
| $\|0, 0\rangle$ | UUUVUU | $\|5, 1\rangle$ | 1 | 100% |

The effect of the sequence of events illustrated in FIG. 11 is summarized in Table 25.

TABLE 25

| Initial defect combination | Events | Final defect combination | Coefficient | Probability |
|---|---|---|---|---|
| $\|0, 0\rangle$ | UVUVUVU | $\|4, 3\rangle$ | 1 | 100% |

Based on the results summarized in Tables 23-25, one notices that by the time the system reaches its final state, it has acquired a number of Type 1 defects equal to the number of recorded U events, and a number of Type 2 defects equal to the number of recorded V events.

(c) No Defects of Type 2 Allowed: $c=s'=1$, $s=c'=0$.

When no Type 2 defects are permitted, the initial system state is defined as $|0, n=0\rangle = |0\rangle$. The sequence of events shown in FIGS. 7B, 8B, and 9B are not allowable for this limiting case, as V cannot act on $|0\rangle$. The effect of the events illustrated in FIGS. 7A, 8A, and 9A is summarized in Table 26.

TABLE 26

| Initial defect count | Events | Final defect count | Coefficient |
|---|---|---|---|
| $\|0, 0\rangle = \|0\rangle$ | U | $\|1\rangle$ | 1 |
|  | V | N/A | N/A |
|  | VU | $\|0\rangle$ | 1 |
|  | UVVU | $\|0\rangle$ | 1 |

Based on the results summarized in Table 26, one recognizes that the event operators U and V correctly render the exact (deterministic) defect count of the final system state. For this limiting case, during each event U, the system acquires one extra Type 1 defect and during each event V, the system sheds one Type 1 defect. For each intermediary step, the probability of knowing the defect count is equal to 1. Therefore, the assessment of the final system state is deterministic.

The effect of the sequence of events illustrated in FIG. 10 is summarized in Table 27.

TABLE 27

| Initial defect combination | Events | Final defect combination | Coefficient | Probability |
|---|---|---|---|---|
| $\|0\rangle$ | UUUVUU | $\|4\rangle$ | 1 | 100% |

The effect of the sequence of events illustrated in FIG. 11 is summarized in Table 28.

TABLE 28

| Initial defect combination | Events | Final defect combination | Coefficient | Probability |
|---|---|---|---|---|
| $\|0\rangle$ | UVUVUVU | $\|1\rangle$ | 1 | 100% |

Based on the results summarized in Tables 26-28, one notices that by the time the system reaches its final state, it has acquired a number of Type 1 defects equal to the difference between the number of recorded U and V events.

(d) Equal Probability Ratios for Failure & Recovery Between Defects $d_1$ & $d_2$: $c=c'$, $s=s'$.

The effect of the events illustrated in FIGS. 9A-9B is summarized in Table 29.

TABLE 29

| Initial defect combination | Events | Final defect combination | Coefficient |
|---|---|---|---|
| $\|0, 0\rangle$ | UVVU | $\|0, 0\rangle$ | $(s^2 + s^2 c)$ |
|  | or | $\|1, 1\rangle$ | $(sc + 2sc^2)$ |
|  | VUUV | $\|2, 2\rangle$ | $c^3$ |

Based on the results summarized in Table 29, the events illustrated in FIGS. 9A-9B render 3 possible defect combinations in the final system state: (i) $|2,2\rangle$ wherein the system acquires 2 extra Type 1 defects and 2 extra Type 2 defects; (ii) $|1,1\rangle$ wherein the system acquires 1 extra Type 1 defect and 1 extra Type 2 defect; (iii) $|0,0\rangle$ wherein the system returns to the initial state after it went through several Type 1 and 2 failures and recoveries. The probability of each final defect count (i)-(iii) is proportional to the square of the coefficient for the respective terms in Table 29.

(e) Equal Probabilities for Failure & Recovery for Defects $d_1$ & $d_2$: $c=s=1/\sqrt{2}$, $c'=s'=1/\sqrt{2}$.

The effect of the events illustrated in FIGS. 8A-8B is summarized in Table 30.

TABLE 30

| Initial defect combination | Events | Final defect combination | Coefficient | Probability |
|---|---|---|---|---|
| $\|0, 0\rangle$ | UV or | $\|0, 0\rangle$ | $1/\sqrt{2}$ | 50% |
|  | VU | $\|1, 1\rangle$ | $1/\sqrt{2}$ | 50% |

Based on the results summarized in Table 30, the events illustrated in FIGS. 8A-8B render 2 possible defect combinations in the final state: (i) there is 50% probability to obtain $|1,1\rangle$, wherein the system acquires 1 extra Type 1 defect and 1 extra Type 2 defect; (ii) there is 50% probability to obtain $|0,0\rangle$, wherein the system returns to the initial state after it went through several Type 1 and 2 failures and recoveries.

The effect of the events illustrated in FIGS. 9A-9B is summarized in Table 31.

TABLE 31

| Initial defect combination | Events | Final defect combination | Coefficient | Probability |
|---|---|---|---|---|
| $\|0, 0\rangle$ | UVVU | $\|0, 0\rangle$ | $[1/2 + 1/(2\sqrt{2})]$ | 32% |
|  | or | $\|1, 1\rangle$ | $(1/2 + 1/\sqrt{2})$ | 63% |
|  | VUUV | $\|2, 2\rangle$ | $1/(2\sqrt{2})$ | 5% |

Based on the results summarized in Table 31, the events illustrated in FIGS. 9A-9B render 3 possible defect combinations in the final system state: (i) |2,2> wherein the system acquires 2 extra Type 1 defects and 2 extra Type 2 defects; (ii) |1,1> wherein the system acquires 1 extra Type 1 defect and 1 extra Type 2 defect; (iii) |0,0> wherein the system returns to the initial state after it went through several Type 1 and 2 failures and recoveries. Note that the probability of each final defect count (i)-(iii) was calculated based on the technique presented in Eq. 7 above.

The effect of the sequence of events illustrated in FIG. 10 is summarized in Table 32.

TABLE 32

| Initial defect combination | Events | Final defect combination | Coefficient | Probability |
|---|---|---|---|---|
| |0,0> | UUUVUU | |4, 0> | (1/2 + 1/√2) | 92% |
|  |  | |5, 1> | 1/(2√2) | 8% |

The effect of the sequence of events illustrated in FIG. 11 is summarized in Table 33.

TABLE 33

| Initial defect combination | Events | Final defect combination | Coefficient | Probability |
|---|---|---|---|---|
| |0, 0> | UVUVUVU | |1, 0> | (5/4 + √2) | 52.9% |
|  |  | |2, 1> | (5/4 + 3√2/4) | 39.8% |
|  |  | |3, 2> | (5/8 + √2/4) | 7.2% |
|  |  | |4, 3> | 1/8 | 0.1% |

Based on the results summarized in Tables 30-33, one concludes that if the initial state of the system was |0,0> and the system went through m U event occurrences, and n V event occurrences, say satisfying m≧n, then the possible defect combinations in the final state are |m−n,0>, |m−n+1, 1>, . . . , |m,n>. In general, the coefficient of the final defect combination |m−n+i,i> is $a_{m-n+i,i}$ (index i is an integer such that 0≦i≦n). The probability $p_{m-n+i,i}$ of encountering this defect combination |m−n+i,i> in the final state is given by:

$$p_{m-n+i,i} = \frac{|a_{m-n+i,i}|^2}{\sum_{j=0}^{n} |a_{m-n+j,j}|^2} \quad (14)$$

The probability to find one of the possible defect combinations in the final system state is 1:

$$\sum_{i=0}^{n} p_{m-n+i,i} = 1 \quad (15)$$

Discussion

Note that the defect-counting method described above, valid under the assumptions m>0 and n>0, led to linear combinations of possible defect combinations in the final state characterized by a high degree of symmetry. As illustrated in Tables 1-18 above, not only the final state possible defect combinations are symmetric with respect to the initial state defect combination, but also their coefficients, and therefore their probabilities, respectively, are symmetric. Furthermore, the operators describing the events in FIGS. 7-11 appear to be commutative. However, there exists an implicit assumption in the treatment presented above that the count of either Type 1 or 2 defects cannot not decrease below 0 (i.e., no "negative" defect count is allowed).

In contrast, the defect-counting method described for situations when m=0 and n=0 (ground state) led to linear combinations of possible defect combinations in the final state which are not symmetric. As illustrated in Tables 19-33 above, the final state possible defect combinations are not symmetric with respect to the initial ground state, as no negative count is possible for either type of defect. Also the coefficients of the possible defect combinations, and therefore their probabilities, are not respectively symmetric. Furthermore, the operators describing the events in FIGS. 7-11 are not commutative anymore. The "breaking" of symmetry for the m=0 and n=0 situation as described above is due to the fact that recovery events are not "allowed" in the ground state. In other words, when no defect is present, the recovery of an inexistent defect is not possible.

Moreover, when the initial defect count is finite, m>0 and n>0, but during successive U and/or V events, the count for at least one of the two defect types reaches 0, the way to evaluate the possible defect count combinations in the system final state is to apply a hybrid method between the techniques presented above. Therefore, when m>0 or n>0, one uses Eqs. 1-4, whereas when m=0 or n=0, one uses Eqs. 10-11.

Summary

The method for updating the system state is summarized below. In general, the state of a system which has been subjected to successive U and/or V events is given by the following linear combination of possible defect counts:

$$\sum_{m,n} a_{m,n}|m, n\rangle \quad (16)$$

When an SPRT5 alarm occurs, one applies event-operator U in the following fashion:

$$\sum_{m,n} a_{m,n} U|m, n\rangle \quad (17)$$

The event operator U in Eq. 17 is given by Eqs. 1-2 if (m≧0 and n>0), or by Eq. 10 if (m≧0 and n=0).

When an SPRT6 alarm occurs, one applies event operator V in the following fashion:

$$\sum_{m,n} a_{m,n} V|m, n\rangle \quad (18)$$

The event operator V in Eq. 18 is given by Eqs. 3-4 if (m>0 and n≧0), or by Eq. 11 if (m=0 and n≧0). Eqs. 17-18 lead to new linear combinations of possible defect counts in the final state:

$$\sum_{i,j} a'_{i,j}|i, j\rangle \quad (19)$$

Each possible defect count combination |i,j> is characterized by the respective probability:

$$p_{i,j} = \frac{|a'_{i,j}|^2}{\sum_{j,l} |a'_{k,l}|^2} \quad (20)$$

$$\text{where } \sum_{i,j} p_{i,j} = 1.$$

In some embodiments, when the probability of a specific unwanted defect combination is deemed unacceptably high, the monitoring process is stopped and one or more remedial actions are performed. In some embodiments, after one or more remedial actions are performed, the system monitoring may be resumed.

Real-Time Telemetry System

Figure 12:
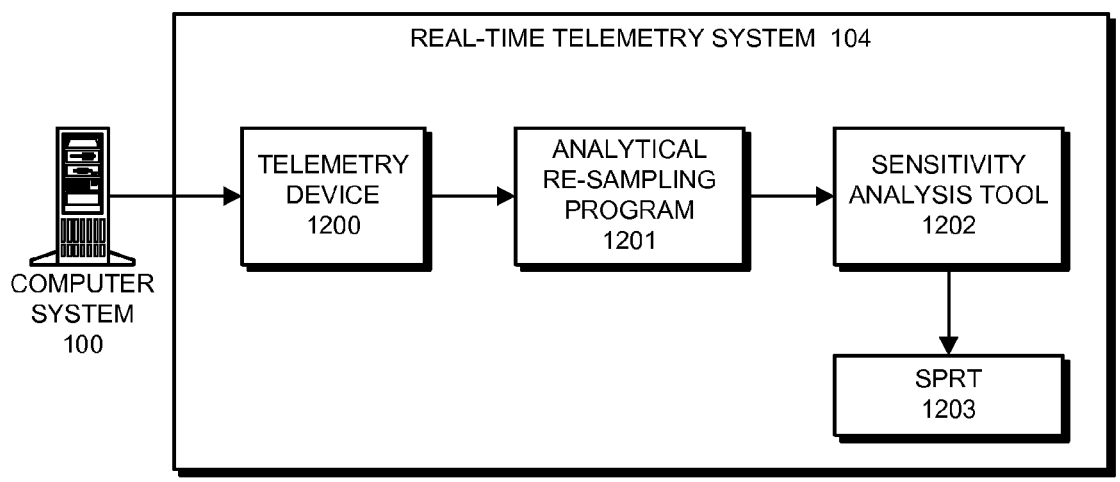
FIG. 12 illustrates a real-time telemetry system in accordance with an embodiment of the present invention.

FIG. 12 illustrates real-time telemetry system 104 in accordance with an embodiment of the present invention. Referring to FIG. 12, computer system 100 can generally include any computational device including a mechanism for servicing requests from a client for computational and/or data storage resources. In one embodiment, computer system 100 is a high-end uniprocessor or multiprocessor server that is being monitored by real-time telemetry system 104.

Real-time telemetry system 104 includes telemetry device 1200, analytical re-sampling program 1201, sensitivity analysis tool 1202, and SPRT module 1203. Telemetry device 1200 gathers information from the various sensors and monitoring tools within computer system 100. In one embodiment, telemetry device 1200 directs the signals to a remote location that contains analytical re-sampling program 1201, sensitivity analysis tool 1202, and SPRT module 1203. In another embodiment of the present invention, one or more of analytical re-sampling program 1201, sensitivity analysis tool 1202, and SPRT module 1203 are located within computer system 100.

Analytical re-sampling program 1201 ensures that the monitored telemetry variables have a uniform sampling rate. In doing so, analytical re-sampling program 1201 uses interpolation techniques, if necessary, to fill in missing data points, or to equalize the sampling intervals when the raw data is non-uniformly sampled.

After the telemetry variables pass through analytical re-sampling program 1201, they are aligned and correlated by sensitivity analysis tool 1202. For example, in one embodiment of the present invention sensitivity analysis tool 1202 incorporates a novel moving window technique that "slides" through the telemetry variables with systematically varying window widths. The system systematically varies the alignment between sliding windows for different telemetry variables to optimize the degree of association between the telemetry variables, as quantified by an "F-statistic," which is computed and ranked for all telemetry variable windows by sensitivity analysis tool 1202.

While statistically comparing the quality of two fits, F-statistics reveal the measure of regression. The higher the value of the F-statistic, the better the correlation is between two telemetry variables. The lead/lag value for the sliding window that results in the F-statistic with the highest value is chosen, and the candidate telemetry variable is aligned to maximize this value. This process is repeated for each telemetry variable by sensitivity analysis tool 1202.

Telemetry variables that have an F-statistic very close to 1 are "completely correlated" and can be discarded. This can result when two telemetry variables are measuring the same metric, but are expressing them in different engineering units. For example, a telemetry variable can convey a temperature in degrees Fahrenheit, while a second telemetry variable conveys the same temperature in degrees Centigrade. Since these two telemetry variables are perfectly correlated, one does not contain any additional information over the other, and therefore, one may be discarded.

Some telemetry variables may exhibit little correlation, or no correlation whatsoever. In this case, these telemetry variables may be dropped because they add little predictive information. Once a highly correlated subset of the telemetry variables has been determined, they are combined into one group or cluster for processing by the SPRT module 1203.

Some embodiments of the present invention continuously monitor a variety of telemetry variables (e.g., sensor signals) in real time during operation of the server. (Note that although we refer to a single computer system in this disclosure, the present invention can also apply to a collection of computer systems).

These telemetry variables can also include signals associated with internal performance parameters maintained by software within the computer system. For example, these internal performance parameters can include, but are not limited to, system throughput, transaction latencies, queue lengths, central processing unit (CPU) utilization, load on CPU, idle time, memory utilization, load on the memory, load on the cache, I/O traffic, bus saturation metrics, FIFO overflow statistics, network traffic, disk-related metrics, and various operational profiles gathered through "virtual sensors" located within the operating system.

These telemetry variables can also include signals associated with canary performance parameters for synthetic user transactions, which are periodically generated for the purpose of measuring quality of service from the end user's perspective.

These telemetry variables can additionally include hardware variables, including, but not limited to, internal temperatures, voltages, currents, vibration, optical power, optical wavelength, air velocity, measures of signal integrity, and fan speeds. In some embodiments, the measures of signal integrity include, but are not limited to, signal/noise ratio, a bit-error rate, the number of times an operation in the component is retried, the size of an eye-diagram opening, the height of the eye-diagram opening, and the width of the eye-diagram opening.

Furthermore, these telemetry variables can include disk-related metrics for a remote storage device, including, but not limited to, average service time, average response time, number of kilobytes (kB) read per second, number of kB written per second, number of read requests per second, number of write requests per second, and number of soft errors per second.

In one embodiment of the present invention, the foregoing telemetry variables are monitored continuously with one or more SPRT tests.

In one embodiment of the present invention, the components from which the telemetry variables originate are field replaceable units (FRUs), which can be independently monitored. Note that all major system components, including both hardware and software components, can be decomposed into FRUs. (For example, a software FRU can include: an operating system, a middleware component, a database, or an application.)

Also note that the present invention is not meant to be limited to server computer systems. In general, the present invention can be applied to any type of computer system. This includes, but is not limited to, a computer system based on a microprocessor, a mainframe computer, a digital signal processor, a portable computing device, a personal organizer, a device controller, and a computational engine within an appliance.

Furthermore, note that the telemetry signals collected by real-time telemetry system 104 do not need to be processed in real-time. For example, the telemetry signals can collected and processed at a later time (e.g., for reliability studies).

SPRT (Sequential Probability Ratio Test)

The Sequential Probability Ratio Test is a statistical hypothesis test that differs from standard fixed-sample tests. In fixed-sample statistical tests, a given number of observations are used to select one hypothesis from one or more alternative hypotheses. The SPRT, however, examines one observation at a time, and then makes a decision as soon as it has sufficient information to ensure that pre-specified confidence bounds are met.

The basic approach taken by the SPRT technique is to analyze successive observations of a discrete process. Let $y_n$ represent a sample from the process at a given moment $t_n$ in time. In one embodiment of the present invention, the sequence of values $\{Y_n\}=y_0, y_1, \ldots, y_n$ comes from a stationary process characterized by a Gaussian, white-noise probability density function (PDF) with mean 0. (Note that since the sequence is from nominally stationary processes, any process variables with a nonzero mean can be first normalized to a mean of zero with no loss of generality).

The SPRT is a binary hypothesis test that analyzes process observations sequentially to determine whether or not the telemetry variable is consistent with normal behavior. When an SPRT reaches a decision about current process behavior (i.e., the telemetry variable is behaving normally or abnormally), the system reports the decision and continues to process observations.

For each of the eight types of tandem SPRT tests described below, the telemetry variable data adheres to a Gaussian PDF with mean 0 and variance $\sigma^2$ for normal signal behavior, referred to as the null hypothesis, $H_0$. The system computes eight specific SPRT hypothesis tests in parallel for each telemetry variable monitored. One embodiment of the present invention applies an SPRT to an electrical current time-series. Other embodiments of the present invention apply an SPRT to other telemetry variables, including voltage, internal temperature, stress variables, and other hardware and software variables.

The SPRT surveillance module executes all eight tandem hypothesis tests in parallel. Each test determines whether the current sequence of process observations is consistent with the null hypothesis versus an alternative hypothesis. The first four tests are: (SPRT 1) the positive-mean test, (SPRT 2) the negative-mean test, (SPRT 3) the nominal-variance test, and (SPRT 4) the inverse-variance test. For the positive-mean test, the telemetry variable data for the corresponding alternative hypothesis, $H_1$, adheres to a Gaussian PDF with mean+M and variance $\sigma^2$. For the negative-mean test, the telemetry variable data for the corresponding alternative hypothesis, $H_2$, adheres to a Gaussian PDF with mean −M and variance $\sigma^2$. For the nominal-variance test, the telemetry variable data for the corresponding alternative hypothesis, $H_3$, adheres to a Gaussian PDF with mean 0 and variance $V\sigma^2$ (with scalar factor V). For the inverse-variance test, the telemetry variable data for the corresponding alternative hypothesis, $H_4$, adheres to a Gaussian PDF with mean 0 and variance $\sigma^2/V$.

The next two tandem SPRT tests (SPRTs 5 and 6) are performed not on the raw telemetry variables as above, but on the first difference function of the telemetry variable. For discrete time series, the first-difference function (i.e., difference between each observation and the observation preceding it) gives an estimate of the numerical derivative of the time series. During uninteresting time periods, the observations in the first-difference function are a nominally stationary random process centered about zero. If an upward or downward trend suddenly appears in the telemetry variable, SPRTs number 5 and 6 observe an increase or decrease, respectively, in the slope of the telemetry variable.

For example, if there is a decrease in the value of the telemetry variable, SPRT alarms are triggered for SPRTs 2 and 6. SPRT 2 generates a warning because the sequence of raw observations drops with time. And SPRT 6 generates a warning because the slope of the telemetry variable changes from zero to something less than zero. The advantage of monitoring the mean SPRT and slope SPRT in tandem is that the system correlates the SPRT readings from the eight tests and determines if the component has failed. For example, if the telemetry variable levels off to a new stationary value (or plateau), the alarms from SPRT 6 cease because the slope returns to zero when the raw telemetry variable reaches a plateau. However, SPRT 2 will continue generating a warning because the new mean value of the telemetry variable is different from the value prior to the degradation. Therefore, the system correctly identifies that the component has failed.

If SPRTs 3 or 4 generate a warning, the variance of the telemetry variable is either increasing or decreasing, respectively. An increasing variance that is not accompanied by a change in mean (inferred from SPRTs 1 and 2 and SPRTs 5 and 6) signifies an episodic event that is "bursty" or "spiky" with time. A decreasing variance that is not accompanied by a change in mean is a common symptom of a failing component that is characterized by an increasing time constant. Therefore, having variance SPRTs available in parallel with slope and mean SPRTs provides a wealth of supplementary diagnostic information.

The final two tandem SPRT tests, SPRT 7 and SPRT 8, are performed on the first-difference function of the variance estimates for the telemetry variable. The first-difference function of the variance estimates is a numerical approximation of the derivative of the sequence of variance estimates. As such, SPRT 7 triggers a warning flag if the variance of the telemetry variable is increasing, while SPRT 8 triggers a warning flag if the variance of the telemetry variable is decreasing. A comparison of SPRT alarms from SPRTs 3, 4, 7, and 8, gives a great deal of diagnostic information on a class of failure modes known collectively as a "change-in-gain without a change-in-mean." For example, if SPRTs 3 and 7 both trigger warning flags, it is an indication that there has been a sudden increase in the variance of the process. If SPRT 3 continues to trigger warning flags but SPRT 7 ceases issuing warning flags, it is an indication that the degradation mode responsible for the increased noisiness has gone to completion. Such information can be beneficial in root causing the origin of the degradation and eliminating it from future product designs.

Similarly, if SPRTs 4 and 8 both start triggering alarms, there is a decrease in variance for the process. If SPRT 4 continues to issue warning flags but SPRT 8 ceases issuing warning flags, it is an indication that the degradation mode has gone to completion. In safety-critical processes, this failure mode (decreasing variance without a change in mean) is dangerous in conventional systems that are monitored only by threshold limit tests. The reason it is dangerous is that a shrinking variance, when it occurs as a result of a transducer that is losing its ability to respond, never trips a threshold limit. (In contrast degradation that manifests as a linear decalibration bias, or even an increasing variance, eventually trips a high or low threshold limit and sounds a warning). A sustained decreasing variance, which happens, for example, when oil-filled pressure transmitters leak their oil, or electrolytic capacitors leak their electrolyte, never trips a threshold in conventional systems, but will be readily detected by the suite of eight tandem SPRT tests taught in this invention.

The SPRT technique provides a quantitative framework that permits a decision to be made between the null hypothesis and the eight alternative hypotheses with specified misidentification probabilities. If the SPRT accepts one of the alternative hypotheses, an alarm flag is set and data is transmitted.

The SPRT operates as follows. At each time step in a calculation, the system calculates a test index and compares it to two stopping boundaries A and B (defined below). The test index is equal to the natural log of a likelihood ratio ($L_n$), which for a given SPRT is the ratio of the probability that the alternative hypothesis for the test ($H_j$, where j is the appropriate subscript for the SPRT in question) is true, to the probability that the null hypothesis ($H_0$) is true.

$$L_n = \frac{\text{probability of observed sequence } \{Y_n\} \text{ given } H_j \text{ is true}}{\text{probability of observed sequence } \{Y_n\} \text{ given } H_0 \text{ is true}} \quad (21)$$

If the logarithm of the likelihood ratio is greater than or equal to the logarithm of the upper threshold limit [i.e., $\ln(L_n) > \ln(B)$], then the alternative hypothesis is true. If the logarithm of the likelihood ratio is less than or equal to the logarithm of the lower threshold limit [i.e., $\ln(L_n) < \ln(A)$], then the null hypothesis is true. If the log-likelihood ratio falls between the two limits, [i.e., $\ln(A) < \ln(L_n) < \ln(B)$], then there is not enough information to make a decision (and, incidentally, no other statistical test could yet reach a decision with the same given Type I and II misidentification probabilities).

Equation (22) relates the threshold limits to the misidentification probabilities $\alpha$ and $\beta$:

$$A = \frac{\beta}{1-\alpha}, \quad B = \frac{1-\beta}{\alpha} \quad (22)$$

where $\alpha$ is the probability of accepting $H_j$ when $H_0$ is true (i.e., the false-alarm probability), and $\beta$ is the probability of accepting $H_0$ when $H_j$ is true (i.e., the missed-alarm probability).

The first two SPRT tests for normal distributions examine the mean of the process observations. If the distribution of observations exhibits a non-zero mean (e.g., a mean of either +M or −M, where M is the pre-assigned system disturbance magnitude for the mean test), the mean tests determine that the system is degraded. Assuming that the sequence $\{Y_n\}$ adheres to a Gaussian PDF, then the probability that the null hypothesis $H_0$ is true (i.e., mean 0 and variance $\sigma^2$) is:

$$P(y_1, y_2, \ldots, y_n | H_0) = \frac{1}{(2\pi\sigma^2)^{n/2}} \exp\left[-\frac{1}{2\sigma^2} \sum_{k=1}^{n} y_k^2\right] \quad (23)$$

Similarly, the probability for alternative hypothesis $H_1$ is true (i.e., mean M and variance $\sigma^2$) is:

$$P(y_1, y_2, \ldots, y_n | H_1) = \frac{1}{(2\pi\sigma^2)^{n/2}} \exp\left[-\frac{1}{2\sigma^2}\left(\sum_{k=1}^{n} y_k^2 - 2\sum_{k=1}^{n} y_k M + \sum_{k=1}^{n} M^2\right)\right] \quad (24)$$

The ratio of the probabilities in (23) and (24) gives the likelihood ratio $L_n$ for the positive-mean test:

$$L_n = \exp\left[-\frac{1}{2\sigma^2} \sum_{k=1}^{n} M(M - 2y_k)\right] \quad (25)$$

Taking the logarithm of the likelihood ratio given by (25) produces the SPRT index for the positive-mean test ($SPRT_{pos}$):

$$SPRT_{pos} = -\frac{1}{2\sigma^2} \sum_{k=1}^{n} M(M - 2y_k) \quad (26)$$
$$= \frac{M}{\sigma^2} \sum_{k=1}^{n} \left(y_k - \frac{M}{2}\right)$$

The SPRT index for the negative-mean test ($SPRT_{neg}$) is derived by substituting −M for each instance of M in (24) through (26) above, resulting in:

$$SPRT_{neg} = \frac{M}{\sigma^2} \sum_{k=1}^{n} \left(-y_k - \frac{M}{2}\right) \quad (27)$$

The next two SPRT tests examine the variance of the sequence. This capability gives the SPRT module the ability to detect and quantitatively characterize changes in variability for processes, which is vitally important for 6-sigma QA/QC improvement initiatives. In the variance tests, the system is degraded if the sequence exhibits a change in variance by a factor of V or 1/V, where V, the pre-assigned system disturbance magnitude for the variance test, is a positive scalar. The probability that the alternative hypothesis $H_3$ is true (i.e., mean 0 and variance $V\sigma^2$) is given by (23) with $\sigma^2$ replaced by $V\sigma^2$:

$$P(y_1, y_2, \ldots, y_n | H_0) = \frac{1}{(2\pi V\sigma^2)^{n/2}} \exp\left[-\frac{1}{2V\sigma^2} \sum_{k=1}^{n} y_k^2\right] \quad (28)$$

The likelihood ratio for the variance test is given by the ratio of (28) to (23):

$$L_n = V^{-n/2} \exp\left[-\frac{1}{2\sigma^2} \frac{1-V}{V} \sum_{k=1}^{n} y_k^2\right] \quad (29)$$

Taking the logarithm of the likelihood ratio given in (29) produces the SPRT index for the nominal-variance test ($SPRT_{nom}$)

$$SPRT_{nom} = \frac{1}{2\sigma^2}\left(\frac{V-1}{V}\right)\sum_{k=1}^{n} y_k^2 - \frac{n}{2}\ln V \quad (30)$$

The SPRT index for the inverse-variance test ($SPRT_{inv}$) is derived by substituting 1/V for each instance of V in (28) through (30), resulting in:

$$SPRT_{inv} = \frac{1}{2\sigma^2}(1-V)\sum_{k=1}^{n} y_k^2 + \frac{n}{2}\ln V \quad (31)$$

The tandem SPRT module performs mean, variance, and SPRT tests on the raw process telemetry variable and on its first difference function. To initialize the module for analysis of a telemetry variable time-series, the user specifies the system disturbance magnitudes for the tests (M and V), the false-alarm probability ($\alpha$), and the missed-alarm probability ($\beta$).

Then, during the training phase (before the first failure of a component being monitored), the module calculates the mean and variance of the monitored variable process signal. For most telemetry variables the mean of the raw observations for the telemetry variable will be nonzero; in this case the mean calculated from the training phase is used to normalize the telemetry variable during the monitoring phase. The system disturbance magnitude for the mean tests specifies the number of standard deviations (or fractions thereof) that the distribution must shift in the positive or negative direction to trigger an alarm. The system disturbance magnitude for the variance tests specifies the fractional change of the variance necessary to trigger an alarm.

At the beginning of the monitoring phase, the system sets all eight SPRT indices to 0. Then, during each time step of the calculation, the system updates the SPRT indices using (26), (27), (30), and (31). The system compares each SPRT index to the upper [i.e., $\ln((1-\beta)/\alpha]$ and lower [i.e., $\ln((\beta/(1-\alpha))]$ decision boundaries, with these three possible outcomes:
1. the lower limit is reached, in which case the process is declared healthy, the test statistic is reset to zero, and sampling continues;
2. the upper limit is reached, in which case the process is declared degraded, an alarm flag is raised indicating a sensor or process fault, the test statistic is reset to zero, and sampling continues; or
3. neither limit has been reached, in which case no decision concerning the process can yet be made, and the sampling continues.

The advantages of using an SPRT are twofold:
1. early detection of very subtle anomalies in noisy process variables; and
2. pre-specification of quantitative false-alarm and missed-alarm probabilities.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for detecting multiple anomalies in a cluster of components, comprising:
   monitoring one or more inferential variables that are received from sensors in the cluster of components;
   obtaining derivatives from the one or more inferential variables using a moving-window numerical derivative technique to calculate the rate-of-change in the one or more inferential variables over a specified time interval;
   monitoring the derivatives obtained from the one or more inferential variables;
   determining whether one or more components within the cluster have experienced an anomalous event based on the monitored derivatives; and
   if so, performing one or more remedial actions.

2. The method of claim 1, wherein determining whether one or more components within the cluster have experienced an anomalous event involves:
   determining whether the monitored derivatives indicate that the value of the one or more inferential variables is changing with a specified polarity; and
   if so, determining that a component in the cluster of components has experienced an anomalous event.

3. The method of claim 1, wherein monitoring derivatives for one or more inferential variables involves using a Sequential Probability Ratio Test (SPRT).

4. The method of claim 1, wherein performing the one or more remedial actions involves one or more of:
   generating warnings;
   replacing failed components;
   reporting the actual number of components that have failed;
   reporting the probability that a specified number of components have failed;
   monitoring additional variables monitored by sensors in the cluster of components;
   adjusting the frequency at which the one or more variables are polled by the sensors;
   adjusting test conditions during an accelerated-life study of the components;
   scheduling the failed components to be replaced at the next scheduled maintenance interval; and
   estimating the remaining useful life of the components.

5. The method of claim 1, wherein the one or more inferential variables received from the sensors include one or more of:
   hardware variables; and
   software variables.

6. The method of claim 5, wherein the hardware variables include one or more of:
   voltage;
   current;
   temperature;
   vibration;
   optical power;
   optical wavelength;
   air velocity;
   measures of signal integrity; and
   fan speed.

7. The method of claim 5, wherein the software variables include one or more of:
   throughput;
   transaction latencies;
   queue lengths;
   central processing unit load;
   memory load;
   cache load;
   I/O traffic;
   bus saturation metrics;
   FIFO overflow statistics;

network traffic; and disk-related metrics.

8. A computer-readable storage medium storing instructions that when executed by a computer cause the computer to perform a method for detecting multiple anomalies in a cluster of components, wherein the method comprises:

monitoring one or more inferential variables that are received from sensors in the cluster of components;

obtaining derivatives from the one or more inferential variables using a moving-window numerical derivative technique to calculate the rate-of-change in the one or more inferential variables over a specified time interval;

monitoring the derivatives obtained from the one or more inferential variables;

determining whether one or more components within the cluster have experienced an anomalous event based on the monitored derivatives; and if so, performing one or more remedial actions.

9. The computer-readable storage medium of claim 8, wherein determining whether one or more components within the cluster have experienced an anomalous event involves:

determining whether the monitored derivatives indicate that the value of the one or more inferential variables is changing with a specified polarity; and if so, determining that a component in the cluster of components has experienced an anomalous event.

10. The computer-readable storage medium of claim 8, wherein monitoring derivatives for one or more inferential variables involves using a Sequential Probability Ratio Test (SPRT).

11. The computer-readable storage medium of claim 8, wherein performing the one or more remedial actions involves one or more of:

generating warnings;

replacing failed components;

reporting the actual number of components that have failed;

reporting the probability that a specified number of components have failed;

monitoring additional variables monitored by sensors in the cluster of components;

adjusting the frequency at which the one or more variables are polled by the sensors;

adjusting test conditions during an accelerated-life study of the components;

scheduling the failed components to be replaced at the next scheduled maintenance interval; and estimating the remaining useful life of the components.

12. The computer-readable storage medium of claim 8, wherein the one or more inferential variables received from the sensors include one or more of:

hardware variables; and software variables.

13. The computer-readable storage medium of claim 12, wherein the hardware variables include one or more of:

voltage;

current;

temperature;

vibration;

optical power;

optical wavelength;

air velocity;

measures of signal integrity; and fan speed.

14. The computer-readable storage medium of claim 12, wherein the software variables include one or more of:

throughput;

transaction latencies;

queue lengths;

central processing unit load;

memory load;

cache load;

I/O traffic;

bus saturation metrics;

FIFO overflow statistics;

network traffic; and disk-related metrics.

15. An apparatus that detects multiple anomalies in a cluster of components, comprising:

a monitoring mechanism configured to:

monitor one or more inferential variables that are received from sensors in the cluster of components;

obtain derivatives from the one or more inferential variables using a moving-window numerical derivative technique to calculate the rate-of-change in the one or more inferential variables over a specified time interval; and monitor the derivatives obtained from the one or more inferential variables;

an analysis mechanism configured to determine whether one or more components within the cluster have experienced an anomalous event based on the monitored derivatives; and a remedial action mechanism, wherein if the analysis mechanism determines that one or more components within the cluster has failed, the remedial action mechanism is configured to perform one or more remedial actions.

16. A method for detecting multiple anomalies in a cluster of components, comprising:

monitoring derivatives obtained from one or more inferential variables which are received from sensors in the cluster of components;

determining whether one or more specified events occurred within the cluster of components based on the monitored derivatives; and if so, determining the probability that the cluster of components is in a specified state based on the one or more specified events that occurred by determining the number of first events x and second events y that occurred; and determining the probability $p_{i,j}$ that the cluster of components is in a specified state $|i,j\rangle$ as:

$$p_{i,j} = \frac{|a'_{i,j}|^2}{\sum_{k,l} |a'_{k,l}|^2};$$

wherein $a'_{i,j}$ is the coefficient associated with the specified state $|i, j\rangle$, and wherein $-y \leq i \leq x$, $-x \leq j \leq y$, $-y \leq k \leq x$, $-x \leq l \leq y$ and $$\sum_{i,j} p_{i,j} = 1.$$

17. The method of claim 16, wherein after determining the probability that the cluster of components is in a specified state, the method further comprises:

determining whether the probability that the cluster of components is in the specified state meets specified criteria; and if so, performing one or more remedial actions.

18. The method of claim 17, wherein performing the one or more remedial actions involves one or more of:

generating warnings;

replacing failed components;

reporting the actual number of components that have failed;

reporting the probability that a specified number of components have failed;

monitoring additional variables monitored by sensors in the cluster of components;

adjusting the frequency at which the one or more variables are polled by the sensors;

adjusting test conditions during an accelerated-life study of the components;

scheduling the failed components to be replaced at the next scheduled maintenance interval; and estimating the remaining useful life of the components.

19. The method of claim 16, wherein the one or more specified events include one or more of:

a first event wherein the value of the inferential variable is increasing; and a second event wherein the value of the inferential variable is decreasing.

20. A computer-readable storage medium storing instructions that when executed by a computer cause the computer to perform a method for detecting multiple anomalies in a cluster of components, wherein the method comprises:

monitoring derivatives obtained from one or more inferential variables which are received from sensors in the cluster of components;

determining whether one or more specified events occurred within the cluster of components based on the monitored derivatives; and if so, determining the probability that the cluster of components is in a specified state based on the one or more specified events that occurred by determining the number of first events x and second events y that occurred; and determining the probability $p_{i,j}$ that the cluster of components is in a specified state $|i,j\rangle$ as:

$$p_{i,j} = \frac{|a'_{i,j}|^2}{\sum_{k,l} |a'_{k,l}|^2};$$

wherein $a'_{i,j}$ is the coefficient associated with the specified state $|i, j\rangle$, and wherein $-y \leq i \leq x$, $-x \leq j \leq y$, $-y \leq k \leq x$, $-x \leq l \leq y$, and $$\sum_{i,j} p_{i,j} = 1.$$

21. The computer-readable storage medium of claim 20, wherein after determining the probability that the cluster of components is in a specified state, the method further comprises:

determining whether the probability that the cluster of components is in the specified state meets specified criteria; and if so, performing one or more remedial actions.

22. The computer-readable storage medium of claim 21, wherein performing the one or more remedial actions involves one or more of:

generating warnings;

replacing failed components;

reporting the actual number of components that have failed;

reporting the probability that a specified number of components have failed;

monitoring additional variables monitored by sensors in the cluster of components;

adjusting the frequency at which the one or more variables are polled by the sensors;

adjusting test conditions during an accelerated-life study of the components;

scheduling the failed components to be replaced at the next scheduled maintenance interval; and estimating the remaining useful life of the components.

23. The computer-readable storage medium of claim 20, wherein the one or more specified events include one or more of:

a first event wherein the value of the inferential variable is increasing; and a second event wherein the value of the inferential variable is decreasing.

* * * * *